United States Patent Office 3,267,113
Patented August 16, 1966

3,267,113
ACYL AMIDES OF 2-(o-AMINOARYL)-2,1,3-BENZOTRIAZOLES
Rudolph A. Carboni, Wilmington, Del., assignor to E. I. du Pont de Nemours and Company, Wilmington, Del., a corporation of Delaware
No Drawing. Filed Mar. 25, 1964, Ser. No. 354,758
17 Claims. (Cl. 260—308)

This invention relates to novel 2-(o-amidoaryl)-2,1,3-benzotriazoles, to compositions of matter containing them, and to methods for preparing the compositions of matter. This application is a continuation-in-part of application U.S. Serial No. 173,806, filed February 16, 1962, which is, in turn, a continuation-in-part of application U.S. Serial No. 13,432, filed March 8, 1960, both now abandoned.

The compositions of this invention correspond in structure to (1) 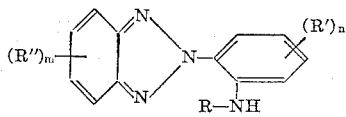

in which R is an acyl group defined in further detail below; R' and R'' are alkyl, divalent alkenyl, more particularly defined hereinafter, alkoxy or an electronegative group, defined in further detail below; and $n$ and $m$ represent the number of R and R' groups present.

The acyl group, represented by R in the above formula, is defined as the group remaining after removal of the —OH moiety from a mono- or dicarboxylic, sulfonic, or phosphonic acid. Thus, R may be divided into three classes: carbacyl (R'''CO—), sulfonyl ($R^{IV}SO_2$—) and phosphonyl ($R^VPO_2$—).

When R is carbacyl (R'''CO—), the R''' moiety represents a wide range of organic groups.

R''' can be a hydrocarbon group containing from 1 to 19 carbon atoms free of acetylenic unsaturation, i.e., a hydrocarbon group in which any unsaturation is either ethylenic or of the benzenoid type. Thus, the hydrocarbon groups include alkyl, alkenyl, cycloalkyl, cycloalkenyl, aryl, alkaryl, aralkenyl, or aralkyl. Specific examples of R'''CO— when R''' is of the immediately preceding definition include acetyl, propionyl, butyroyl, valeroyl, capryloyl, tridecanoyl, octadecanoyl, acryloyl, crotonoyl, sorboyl, methacryloyl, α-ethacryloyl, α-butacryloyl, α-octaacryloyl, 1-octadecenoyl, cyclobutyroyl, cyclooctanoyl, cyclohexenoyl, benzoyl, naphthoyl, toluoyl, o-butylbenzoyl, 2,4,6-trimethylbenzoyl, β-methylnaphthoyl, α-phenacryloyl, hexahydrobenzoyl, phenacetyl, 1-naphthylacetyl, 2-phenylbutyroyl, pivaloyl, o-methylhexahydrobenzoyl, 1,4-dibutylhexahydrobenzoyl, and the like.

R''' may also be a substituted hydrocarbon group containing from 1 to 19 carbon atoms free of acetylenic unsaturation in which the substituents include halogen of atomic number 9–35 (fluorine, chlorine and bromine), nitro, amino, hydroxy, carboxy, metal carboxylate, halocarbonyl, alkoxy, and alkoxycarbonyl of up to 7 carbon atoms, and o-[2(2,1,3-benzotriazolyl)]-phenylaminocarbonyl. Specific examples of these R'''CO— groups include chloroacetyl, 3,4-dibromobutenoyl-1, ω-hydroperfluoropropionyl, perfluorobutanoyl, 2-aminocaproyl, α-bromocaproyl, 2-methyl-4-chlorobenzoyl, 1,6-dibromonaphthoyl, 2-nitropropionyl, 3,5-dinitrobenzoyl, hydroxyacetyl, ω-hydroxybutyroyl, salicyloyl, m-nitrosalicyloyl, methoxyacetyl, chloroformylacetyl, ω-ethoxybutyroyl, 5-butoxycapryloyl, carbethoxyacetyl, carboxyacetyl, 3-carboxypropionoyl, 5-carboxypentanoyl, 2- or 4-carboxybenzoyl, 2,3,5,6-tetramethyl-4-carboxybenzoyl. These last six groups are of course derived from dicarboxylic acids with one of the carboxyl groups forming the —CO— of R'''CO—. The remaining carboxy group can be converted to a different substituent, e.g., to a metal carboxylate, halocarbonyl, etc. These R'''CO— groups derived from dicarboxylic acids may be represented by the formula (2) 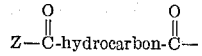

where Z is lower alkoxy, halogen (fluorine, chlorine or bromine), metal oxide (e.g., Ca, Ba or Zn oxides), and o-[2(2,1,3 - benzotriazolyl)]-phenylamino. The hydrocarbon in this formula is preferably alkylene of 1 to 12 carbon atoms, cycloalkylene of 5–6 carbon atoms, phenylene or 2,3,5,6-tetramethylphenylene. More specifically, the substituents of Formula 2 can be represented by the formulas

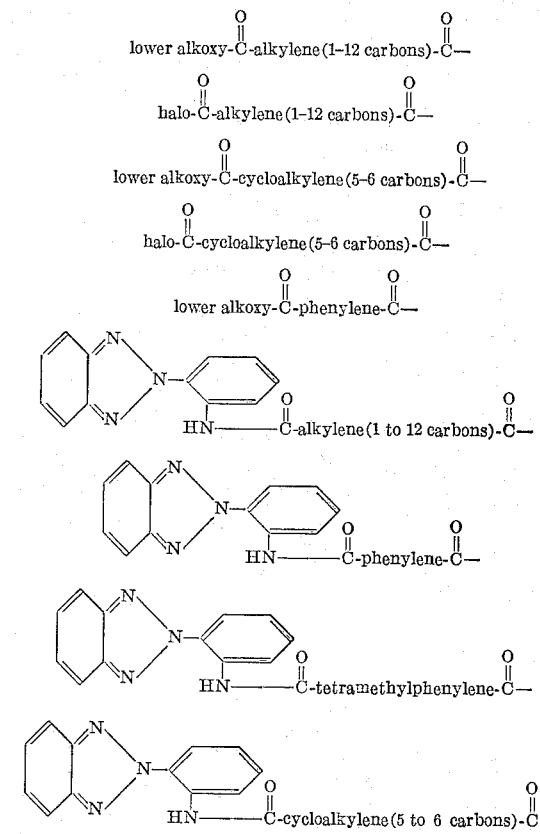

and the like.

R''' may also be a heterocyclic ring which can be monocyclic or fused bicyclic in which there may be 1–3 hetero atoms present selected from oxygen, sulfur or nitrogen, or combinations thereof, and which contains 3–9 carbon atoms. Examples of these R''' groups include pyridinyl, piperidinyl, furyl, thiazolyl, benzothiazolyl, quinoxalinyl, and the like.

When R is sulfonyl ($R^{IV}SO_2$—) or phosphonyl ($R^VPO_2$—), the $R^{IV}$ and $R^V$ moieties can be a hydrocarbon free of acetylenic unsaturation of from 1 to 19 carbon atoms. The specific hydrocarbon groups are the same as those used previously to define R'''. Specific examples of these acyl groups include ethanesulfonyl, butanesulfonyl, decanesulfonyl, tetradecanesulfonyl, methanephosphonyl, butanephosphonyl, methylhexanephosphonyl, heptanephosphonyl, propene-1-sulfonyl, cyclohexanesulfonyl, cyclohexanephosphonyl, benzene sulfonyl, benzenephosphonyl, naphthalenesulfonyl, o-methylbenzenesulfonyl, toluenephosphonyl, α-methylnaphthalenesulfonyl, o-methylcyclohexanesulfonyl, and the like.

In addition, $R^{IV}$ may be a monovalent heterocyclic ring which can be monocyclic or fused bicyclic and of 4–9 carbon atoms wherein the hetero atoms are selected from oxygen, sulfur or nitrogen or combinations thereof. Examples of these acyl groups include pyridinesulfonyl, piperidinesulfonyl, α-methylpyridinesulfonyl, α-butylpiperidinesulfonyl, benzothiazolesulfonyl, and the like.

R' and R" may be the same or different, preferably the same, and are alkyl or alkoxy of up to 19 carbon atoms, alkenyl of 4 to 8 carbons, which forms a fused areno structure of 10–14 carbons with the benzo or aminophenyl rings, or an electronegative group. Exemplary of alkyl and alkoxy groups are ethyl, propyl, hexyl, octyl, decyl, dodecyl, tetradecyl, octadecyl, ethoxy, propoxy, butoxy, heptyloxy, decyloxy, tetradecyloxy, octadecyloxy and the like. Exemplary alkenyl radicals of 4 to 8 carbons which form a fused areno structure of 10 to 14 carbons with the benzo or aminophenyl rings are butadienylene and benzbutadienylene. The electronegative groups are halo of atomic number 9–35 (fluorine, chlorine, or bromine), nitro, sulfo, alkali metal, e.g., sodium sulfo salt, carboxy or cyano.

Areno is used herein to refer to the aromatic structures of 10 or 14 carbons formed by the fusion of a four or eight carbon system, in which a hydrogen atom has been removed from each of the terminal carbon atoms, to the benzo or 2-aryl rings, or to both. Thus, the radical formed by a four carbon areno group is naphthyl and phenanthryl by an eight carbon areno group.

Aromatic is used herein in its classical sense as defined, for example, in A. Todd's "Perspectives in Organic Chemistry," Interscience Publishers, Inc., New York (1956), page 28, etc.

There can be more than one R' or R" group on the nucleus, thus m and n each are cardinal numbers which may vary from 0 to 4. Preferably m and n are 0 to 2. Of course where R' or R" is an areno group, only one such group may be present, since it then forms a condensed ring system with the benzo or aminophenyl group. When no R' or R" groups are present, i.e., when m or n is zero, the unsubstituted position on the ring contains hydrogen.

The 2-(o-amidoaryl)-2,1,3-benzotriazoles of this invention are prepared by acylating a 2-(o-aminoaryl)-2,1,3-benzotriazole. The o-aminoaryl reactant can be prepared by oxidizing an o,o'-diaminoazoaryl compound in a nitrogen-containing solvent, or it can be prepared by reducing a dibenzo-1,3a,4,6a-tetraazapentalene with a reducing agent, such as lithium aluminum hydride.

In the method which employs o,o'-diaminoazoaryl compound as the precursor, the oxidizing agent can be cupric sulfate, chromium trioxide, or similar strong oxidizing agents. Of these, the preferred are the milder cupric compounds. The amount of oxidizing agent is at least 0.25 mole per mole of o,o'-diaminoazoaryl compound. In order to insure complete reaction, a large excess of oxidizing agent, of the order of 2 to 10 moles per mole of o,o'-diaminoazoaryl compound, is usually employed.

Any nitrogen-containing solvent for the oxidizing agent can be used, but preferred solvents are pyridine and ammonia because of the satisfactory results obtained therewith.

After the oxidizing agent and o,o'-diaminoazoaryl compound are admixed, the temperature of the reactants is initially kept ambient up to one hour. Thereafter, the reactant mixture is heated to reflux for from one to four hours, depending upon the particular situation. The reaction mixture is then cooled to ambient temperature and extracted with an organic solvent, e.g., diethyl ether. The extract is decolorized with activated carbon, dried over anhydrous sodium or magnesium sulfates, and evaporated to dryness to recover the desired product. Alternatively, the reaction mixture is poured onto 4–5 volumes of ice-water and the precipitated product collected by filtration.

The procedure described above is equally applicable to the preparation of substituted 2-(o-aminoaryl)-2,1,3-benzotriazole derivatives. Thus, o-arylenediamines which contain substituents, such as alkyl, alkoxy, nitro, fluoro, chloro, bromo, sulfonyl or salt thereof, and carboxy, may be oxidized to the corresponding o,o'-diaminoazoaryl compound with $PbO_2$. The second oxidation to yield the appropriate aryltriazoles is then carried out as described above, e.g., with cupric sulfate in pyridine or ammonium hydroxide.

In the method which employs a dibenzo-1,3a,4,6a-tetraazapentalene as the starting material, it is convenient to disperse the reducing agent in a suitable liquid, inert, organic medium and to add the dibenzo-1,3a,4,6a-tetraazapentalene in solution in a liquid inert medium, which is preferably the same as the medium used in dispersing the reducing agent, to the dispersion of the reducing agent, at a slow controlled rate, with stirring. Thereafter, the reaction mixture is allowed to stand with stirring at ambient temperature for at least one-half hour and then refluxed for two or more hours. Excess reducing agent and any derivatives of the reducing agent formed are decomposed, and the reaction mixture is then extracted with an organic solvent. Evaporation of the extract yields the desired 2-(o-aminophenyl)-2,1,3-benzotriazole.

Suitable reaction media include tetrahydrofuran, tetrahydronaphthalene, decahydronaphthalene, pyridine, cyclohexane, and the like.

The total amount of reaction medium used is not critical and can equal or exceed by many fold the total weight of the reactants.

The reducing agent used is a material such as lithium aluminum hydride or other known reducing agent, such as, sodium or potassium-aluminum hydrides, or lithium, sodium, and potassium borohydrides.

The amount of reducing agent employed is at least 0.25 mole per mole of dibenzo-1,3a,4,6a-tetraazapentalene. Generally, however, the amount used is from 4 to 8 moles of the hydride per mole of tetraazapentalene.

The temperature of the reaction mixture can range from 0° C. up to the reflux temperature of the reaction medium, e.g., up to 150° C.

Dibenzo-1,3a,4,6a-tetraazapentalene is prepared from o,o'-diazidoazobenzene as described in U.S. Reissue Patent Re. 25, 238, reissued September 11, 1962, a reissue of U.S. Patent 2,904,544, issued to R. A. Carboni, as follows:

To 700 ml. of decalin there is added 8.2 g. of o,o'-diazidoazobenzene, prepared as described subsequently, the mixture is heated to 160° C., and then maintained at 160° to 180° C. for 2.5 hours. The decalin solution is concentrated to 75 ml. under reduced pressure, whereupon long yellow needles of dibenzo-1,3a,4,6a-tetraazapentalene separate, M.P. 237° to 238° C.

The infrared spectrum shows absence of N—H or —$N_3$ functions. The general spectral features are in agreement with the assigned structure.

The ultraviolet spectrum shows three main peaks at 2545 A. ($\epsilon$ 65,500), 3225 A. ($\epsilon$ 4,575), and 4020 A. ($\epsilon$ 40,000). The product analyzes:

*Analysis.*—Calcd. for $C_{12}H_8N_4$: C, 69.22%; H, 3.87%; N, 26.91%; M.W., 208. Found: C, 69.06%; H, 3.99%; N, 26.96%; M.W., 221.

The o,o'-diazidoazobenzene used in the above experiment is prepared as follows:

To a stirred mixture of 4.3 g. (0.02 mole) of o,o'-diaminoazobenzene in 40 ml. of concentrated hydrochloric acid and 40 ml. of water, at 5° C., there is gradually added 4.0 g. (0.058 mole) of sodium nitrite in 20 ml. of water. The insoluble amine hydrochloride gradually dissolves as the diazonium salt forms. The mixture is stirred at 5° C. for an additional hour. Urea is then added to destroy any excess nitrous acid. Sodium azide (3.8 g., 0.06 mole) in 20 ml. of water (5° C.) is slowly added with stirring. Nitrogen is evolved and a colored solid precipitates. The mixture is stirred for 30 minutes at 5° C. and for two hours at room temperature. The solid o,o'-diazidoazobenzene has a melting point, with dec., of 107° to 108° C., and the infrared spectrum is consistent with the assigned structure.

*Analysis.*—Calcd. for $C_{12}H_8N_8$: C, 54.54%; H, 3.05%; N, 42.41%. Found: C, 54.75%; H, 3.31%; N, 42.37%.

As is disclosed in the aforesaid Reissue Patent 25,238, substitution products of dibenzo-1,3a,4,6a-tetraazapentalene are readily prepared by treating the latter with a halogenating, nitrating, or sulfonating reagent, e.g., chlorine, nitric acid, or chlorosulfonic acid. Such reagents do not degrade the ring system because it is highly stable.

Substituted dibenzo-1,3a,4,6a-tetraazapentalenes are also prepared from the corresponding substituted o,o'-diaminoazobenzenes, i.e., diaminoazobenzenes which contain substituents such as alkyl, alkoxy, carboxy, fluoro, chloro, bromo, nitro, etc.

All of these substituted diaminoazobenzenes can be converted to the corresponding diazides and thence to the corresponding substituted dibenzo-1,3a,4,6a-tetraazapentalenes. These derivatives, with the exception of the nitro derivatives may be converted to the corresponding substituted 2-(o-aminophenyl)-2,1,3-benzotriazoles by the same procedure described above for the unsubstituted product. The nitro substituted derivatives of 2-(o-aminophenyl)-2,1,3-benzotriazole can be obtained either by direct nitration or by the oxidative-cyclization of o,o'-diaminoazobenzenes containing nitro substituents.

The acylamides of this invention are readily prepared by acylating the 2-(o-aminoaryl)-2,1,3-aryltriazole to the N-monoacylamides by reacting the free amine group with the acylating agent, preferably in the presence of an acid acceptor, e.g., an alkali metal hydroxide or a tertiary amine, such as pyridine or triethylamine. The acylating agents, whether they be carboxylic, sulfonic or phosphonic acids, anhydrides or acid halides, etc., are employed in an equivalent manner to yield the desired monoamide derivative; and, therefore, an example of one type of acylating agent, e.g., a carboxylic acid, is equally illustrative of, e.g., the corresponding sulfonic and phosphonic acids.

Specific acylating agents useful in preparing the N-acylamides of the 2-(o-aminoaryl)-2,1,3-benzotriazoles are formic, acetic, and propionic acids, acetic anhydride, pivaloyl chloride, acryloyl chloride, methacryloyl chloride, anisoyl chloride, acetyl chloride, ω-hydroperfluoropropionyl chloride, perfluorobutanoyl chloride, 2-nitrocaproyl bromide, octadecenoyl chloride, α-ethylacryloyl bromide, α-butylacryloyl chloride, adipoyl chloride, succinoyl bromide, 4-ethoxybutyroyl chloride, benzoic acid, toluoyl chloride, 3-hydroxypropionyl chloride, benzoyl chloride and bromide, p-tert-butyl benzoyl bromide and chloride, 2-methyl-4-chlorobenzoyl chloride, 3,5-dinitrobenzoyl chloride, caproic acid and anhydride, methanesulfonyl chloride, ethanesulfonyl iodide, cyclohexanesulfonyl chloride, butanesulfonyl chloride, o-methylhexahydrobenzoyl chloride, o-nitrohexahydrobenzoyl bromide, 1,2-dicarboxycyclohexane, perfluoroacetyl chloride, monobromodifluoroacetyl chloride, phthaloyl chloride, terephthaloyl chloride, tetramethylterephthaloyl chloride, ethylene-1,2-bis-(4,4'-chloroformylbenzene), sorboyl chloride, dodecanoyl chloride, pyridine carboxylic acid, quinoline carboxylic acid, naphthoyl chlorides, β-methylnaphthoyl chloride, camphoroyl chloride, diethyl oxalate, and the like.

In effecting the N-acylation with monoacylating agents, the acylating agent and amine are used in chemically equivalent amounts. On the other hand, when a diacylating agent is used, two chemically equivalent proportions of the amine are employed for the 2:1 product and one equivalent for the 1:1 product, e.g., N-monocarbonamide, N-monosulfonamide, or N-monophosphonamide. Salts of the N-monocarbonamides, e.g., the calcium, barium, zinc, and like salts can be readily made by known methods. Such salts can be employed as pigments in polymeric compositions and other applications where pigments are known to be useful.

The examples which follow illustrate but do not limit this invention.

EXAMPLE I

A 0.6-g. sample of 2-(o-aminophenyl)-2,1,3-benzotriazole, prepared as described below, was heated with 5 ml. of acetic anhydride on a steam bath for one and one-half hours. The solution was concentrated to about one-half its original volume and then poured into ice water. After one hour, the solid which had separated was collected by filteration and recrystallized from aqueous ethanol. The 2 - (o-N-monoacetamidophenyl)-2,1,3-benzotriazole thus obtained was a crystalline solid which melted at 108° C. The ultraviolet spectrum of this product showed maxima at 3000 A. ($\epsilon$ 15,200), 2520 A. ($\epsilon$ 7300), and 2230 A. ($\epsilon$ 19,900). These data, as well as the NH and amide carbonyl peaks exhibited in the infrared spectrum, are consistent with the structure of 2-(o-N-monoacetamidophenyl)-2,1,3-benzotriazole.

The 2-(o-aminophenyl)-2,1,3-triazole used in this example and in other examples was prepared as follows:

o,o'-Diaminoazobenzene (4.4 g.) was dissolved in 50 ml. of pyridine. To this solution there was added in portions with stirring 12.8 g. of anhydrous copper sulfate at room temperature. After 30 minutes at room temperature, the reaction mixture was heated on a steam bath for one hour. The pyridine solution was cooled and poured into four volumes of ice water, and extracted with four 150-ml. portions of diethyl ether. The four ether extracts were combined, treated with activated carbon, and dried over anhydrous sodium sulfate. The extract was evaporated to dryness, leaving a yellow oil which solidified on cooling. To the solid there was added petroleum ether and the slurry filtered. The crystalline solid was taken up in hot ethanol and the solution allowed to cool. The yellow crystals which separated on cooling were collected. The yield of 2-(o-aminophenyl)-2,1,3-benzotriazole was 64%, based on the weight of the o,o'-diaminoazobenzene used. The product melted at 97° to 98° C. The infrared and ultraviolet spectra of this product were found to be consistent for the desired product.

EXAMPLE II

To a mixture of 0.9 g. of 2-(o-aminophenyl)-2,1,3-benzotriazole, prepared as in Example I, in 7 ml. of water was added alternately 2 g. of benozyl chloride and 10 g. of 20% aqueous sodium hydroxide, with vigorous shaking between each addition. After one hour the pale yellow solid which formed was collected by filtration, washed with water, and recrystallized from 400 ml. of ethanol to yield 1.1 g. of very pale yellow needles, M.P. 123° C. The product analyzed:

Calcd. for $C_{19}H_4N_4$: N, 17.83%. Found: N, 18.03%.

The ultraviolet spectrum showed maxima at 3200 A. ($\epsilon$ 14,600), extending to 3750 A. ($\epsilon$ 410), 3050 A. ($\epsilon$ 16,000), and 2770 A. ($\epsilon$ 19,300), and 232 A. ($\epsilon$ 23,200). These data, together with the infrared spectrum, confirm the structure of the product as corresponding to that of 2-(o-N-monobenzamidophenyl)-2,1,3-benzotriazole.

EXAMPLE III

A solution of 4.2 g. of 2-(o-aminophenyl)-2,1,3-benzotriazole, prepared as in Example I, in tetrahydrofuran was treated with 6.1 g. of stearoyl chloride, followed by addition of triethylamine in amount slightly in excess of the molar equivalent of the stearoyl chloride. The reaction mixture was shaken vigorously for 15 minutes, heated on a steam bath for 10 minutes, and filtered to remove triethylamine salt. The filtrate was then evaporated to dryness. Recrystallization of the solid residue from petroleum ether gave 5.7 g. of almost colorless crystals melting at 83° to 84° C. An additional crop of crystals was obtained on concentrating the mother liquor. The ultraviolet spectrum in cyclohexane showed maxima at 3280 A. (ε 14,700), 3010 A. (ε 15,200), 2620 A. (ε 13,400), 2540 A. (ε 13,900), and 2340 A. (ε 20,700). These data are consistent with the structure 2-(o-N-monostearamidophenyl)-2,1,3-benzotriazole.

EXAMPLE IV

A 5-g. sample of 2-(o-aminophenyl)-2,1,3-benzotriazole, prepared as in Example I, was treated with a molar excess of p-anisoyl chloride suspended in 50 ml. of 10% aqueous sodium hydroxide by the procedure of Example III. Recrystallization of the solid residue from ethanol yielded a crystalline product, M.P. 167.5–168.5° C., characterized as 2-(o-N-mono-p-anisamidophenyl)-2,1,3-benzotriazole. This product analyzed:

Calcd. for $C_{20}H_{16}N_4O_2$: C, 69.76%; H, 4.68%. Found: C, 70.15%; H, 4.83%.

EXAMPLES V–XII

The compounds listed in the right column of the following Table I are obtained in accordance with the procedure of Example II by substituting the reagents listed in the left column of the table for the benzoyl chloride of Example II.

TABLE I

| | Reagent | Product |
|---|---|---|
| V | 2-methyl-4-chlorobenzoyl chloride. | 2-(o-N-mono-2-methyl-4-chlorobenzamidophenyl)-2,1,3-benzotriazole. |
| VI | Ethanesulfonyl chloride | 2-(o-N-monoethanesulfonamidophenyl)-2,1,3-benzotriazole. |
| VII | o-Xylylsulfonyl chloride | 2-(o-N-mono-2,3-dimethylbenzenesulfonamidophenyl)-2,1,3-benzotriazole. |
| VIII | 3,5-dinitrobenzoyl chloride | 2-(o-N-mono-3,5-dinitrobenzamidophenyl)-2,1,3-benzotriazole. |
| IX | Dodecanoic acid bromide | 2-(o-N-monododecanamidophenyl)-2,1,3-benzotriazole. |
| X | Pyridine-3-carboxylic acid | 2-(o-N-monopyridin-3-amidophenyl)-2,1,3-benzotriazole. |
| XI | Quinoline-4-carboxylic acid | 2-(o-N-monoquinolin-4-amidophenyl)-2,1,3-benzotriazole. |
| XII | t-Butylsulfonyl chloride | 2-(o-N-mono-t-butylsulfonamidophenyl)-2,1,3-benzotriazole. |

EXAMPLE XIII

A. *Monomer*

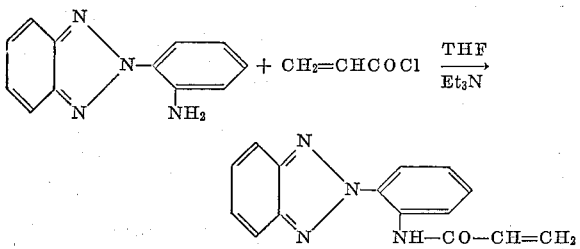

To a stirred solution of 350 g. of 2-(o-aminophenyl)-2,1,3-benzotriazole (1.66 mole) in 2 l. of tetrahydrofuran (THF), containing 150 g. of triethylamine (Et₃N), was slowly added 150 g. (1.66 mole) of acrylyl chloride in 200 ml. of tetrahydrofuran. The addition required 45 minutes. The mixture was stirred for one day with no external heat, then filtered to collect the solid. The filtrate was concentrated to one third of its volume, then poured into 2 l. of ice water. The original solid was also added to the ice water and the mixture stirred for 15 minutes. The insoluble solid was collected by filtration and crystallized from 1.1 l. of ethanol, after decolorization with activated carbon (362 g. of yellow solid). Evaporation of the mother liquor, followed by a hexane recrystallization, yielded an additional 16 g. of crystalline solid. Recrystallization of the product from hexane (2 l.), with another activated carbon treatment, yielded 200 g. of long yellow needles of 2-(o-N-acrylamidophenyl)-2,1,3-benzotriazole, M.P. 96.0–96.8° C.

*Analysis.*—Calcd. for $C_{15}H_{12}N_4O$: C, 68.16%; H, 4.57%; N, 21.20%. Found: C, 69.30%; H, 4.81%; N, 21.11%.

The ultraviolet spectrum showed a broad absorption at 300 mμ, which extended very slightly into the visible region at 400 mμ.

B. *Polymer.* 1. *Thermal.*—2-(o-N-acrylamidophenyl)-2,1,3-benzotriazole, (109 g.) was placed in a flask under nitrogen and the flask immersed in an oil bath preheated to 250° C. The mixture was maintained at this temperature for 30 minutes, then extracted with o-dichlorobenzene (200 ml.) by refluxing for 30 minutes. All but a very small quantity dissolved. The cooled extract was poured, with stirring, into ethanol, whereupon the colorless polymer separated. The solid was collected by filtration, washed with fresh ethanol, then dried at reduced pressure.

*Analysis.*—Calcd. for $(C_{15}H_{12}N_4O)_n$: C, 68.16%; H, 4.57%; N, 21.20%. Found: C, 66.65%; H, 4.55; N, 20.28%.

The infrared spectrum showed some similarity to the spectrum of the monomer, except for the appearance of saturated C—H peaks and the shift of the >C=O to frequencies associated with unconjugated amide carbonyls.

2. *Azo initiation.*—A mixture of 100 g. of 2-(o-acrylaminophenyl)-2,1,3-benzotriazole and 2.0 l. of benzene containing 0.2 g. of α,α-azodiisobutyronitrile was stirred at reflux under nitrogen. After three hours, an additional 0.2 g. of α,α-azodiisobutyronitrile catalyst was added and heating continued for an additional hour. The mixture was allowed to stand at room temperature overnight. The viscous mixture was reheated to reflux, decolorized with activated carbon, and poured into three volumes of ethanol, whereupon the poly-2-(o-N-acrylamidophenyl)-2,1,3-benzotriazole precipitated. The colorless polymer was collected by filtration, washed with ethanol, then ether, and finally dried (72 g.).

*Analysis.*—Calcd. for $(C_{15}H_{12}N_4O)_n$: C, 68.17%; H, 4.57%; N, 21.20%. Found: C, 66.72%; H, 4.50%; N, 20.80%.

The infrared and ultraviolet spectra of this product were almost identical to that of the thermal polymer.

EXAMPLE XIV

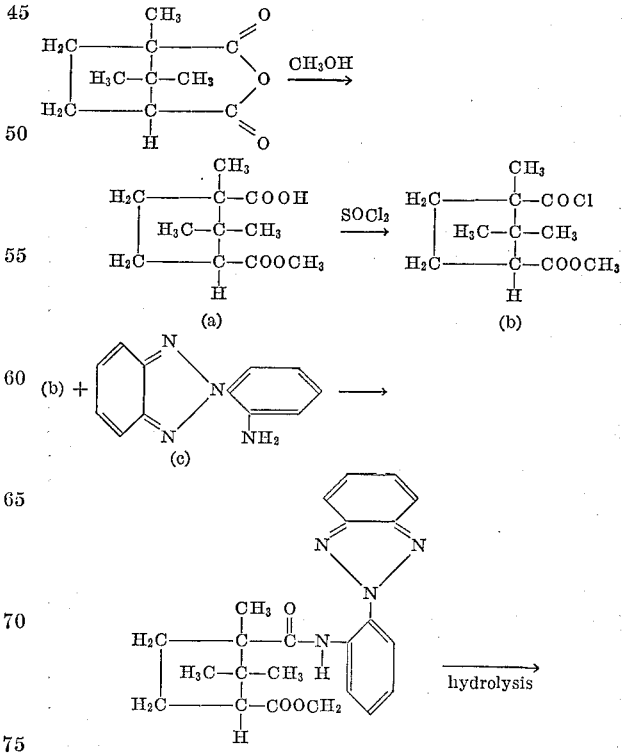

EXAMPLE XIV—Continued

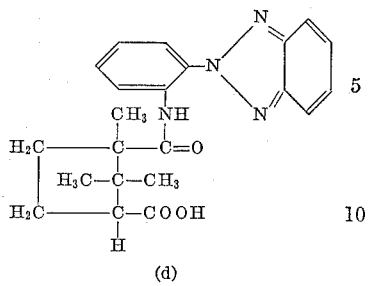

(d)

The formation of the α- (or o-) camphoric acid ester (a) was accomplished by the procedure of J. Walker (J. Chem. Soc., 61, 1088 (1892)). Subsequent treatment with excess thionyl chloride gave the acid chloride (b).

The acid chloride, 23.3 g. (0.1 mole) in 25 ml. of tetrahydrofuran, was added to a stirred mixture of 21 g. (0.1 mole) of 2-(o-aminophenyl)-2,1,3-benzotriazole in 200 ml. of tetrahydrofuran. Triethylamine (11 g.) was then added and the mixture heated at reflux for 3½ hours. An oily product was obtained when the reaction mixture was poured into six volumes of ice water. The oil was taken up in 300 ml. of ether. The latter was washed with water, dried over magnesium sulfate, and evaporated to dryness. The infrared spectrum of the oily residue was consistent with the assigned structure of the monoamido derivative.

A portion of the oily product was saponified by refluxing with alcoholic potassium hydroxide for 5½ hours. The mixture was diluted with four volumes of ice water and extracted with ether to remove any basic or neutral components. The aqueous solution was then acidified and re-extracted with ether. This ether extract was washed with water, dried, and evaporated to dryness. The oil was transformed to a colorless solid on addition of a benzene-hexane mixture. Crystallization from this solvent mixture (300 ml.) gave a crop of colorless crystals, (M.P. 154–155.4° C.).

The infrared spectrum indicated that the ester group had saponified while the more sterically hindered 2-(o-N-monocamphoramidophenyl)-2,1,3-benzotriazole moiety remained intact.

*Analysis.*—Calcd. for $C_{22}H_{24}N_4O_3$: C, 67.33%; H, 6.17%; N, 14.23%. Found: C, 66.76%; H, 6.05%; N, 14.02%.

The ultraviolet spectrum in ethanol exhibited absorption maxima at 325 m$\mu$ ($\epsilon$ 14,000), 300 m$\mu$ ($\epsilon$ 15,650), 260 m$\mu$ ($\epsilon$ 12,830), 253 m$\mu$ ($\epsilon$ 13,700) and 227 m$\mu$ ($\epsilon$ 22,400).

EXAMPLE XV

A mixture of 21 g. of 2-(o-aminophenyl)-2,1,3-benzotriazole (0.1 mole), 200 ml. of tetrahydrofuran, 11 g. of triethylamine, and 12.1 g. of pivaloyl chloride (0.1 mole) was placed in a reactor and the mixture agitated for 3.5 hours at reflux. Thereafter the contents of the reactor were allowed to cool and placed on a steam bath under vacuum. When the volume had been reduced by two thirds, the reaction mixture was allowed to cool and a large volume of water was added. The small amount of solid which formed was separated by filtration, and added to the reaction mixture. The reaction mixture and solid was then stirred at room temperature for four hours. The solid which formed was removed by filtration, triturated in water, filtered, and then washed with water on the filter. The solid was air-dried and weighed 35.5 g. It was pale yellow in color and melted at 79° to 80° C. After recrystallization from a mixture of 50 cc. of water and 150 cc. of ethanol containing benzene, there was obtained 21 g. of product melting at 81° C. The infrared spectrum of this product was consistent with that of 2-(o-N-pivalamidophenyl)-2,1,3-benzotriazole.

EXAMPLE XVI

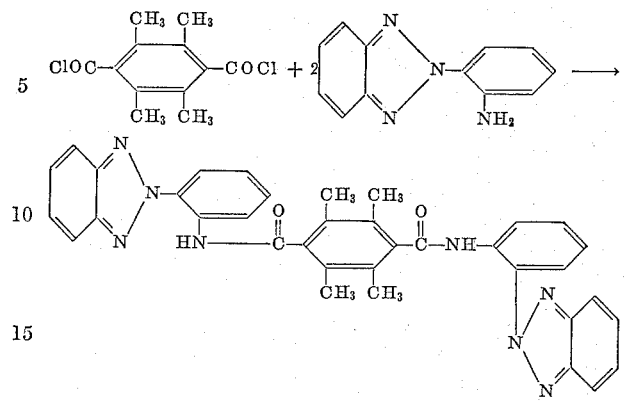

A mixture of 400 g. of 2,3,5,6-tetramethylterephthaloyl chloride and 651 g. of 2-(o-aminophenyl)-2,1,3-benzotriazole, 400 ml. of triethylamine, and 1500 ml. of dry monochlorobenzene was heated in an inert atmosphere at 60° to 70° C. for 30 hours. The reaction mixture was allowed to cool, and the product which separated was removed by filtration. The filter cake was then washed successively with monochlorobenzene, acetone, water, dilute sodium hydroxide, water, and finally acetone. The [2,2' - (2,3,5,6 - tetramethylterephthaloyldiimino) - o-phenylene]-bis-2,1,3-benzotriazole thus prepared was a slightly cream-colored solid. Upon recrystallization from monochlorobenzene, a snow-white solid melting at 290° C. was obtained. The infrared spectrum of this product was consistent with the structure of [2,2'-(2,3,5,6-tetramethylterephthaloyldiimino) - o - phenylene] - bis-2,1,3-benzotriazole. The ultraviolet spectrum of this compound exhibited an absorption maximum in solution in concentrated sulfuric acid at 307 m$\mu$ ($\epsilon$ 33,600).

The 2,3,5,6-tetramethylterephthaloyl chloride used in the above experiment was prepared as follows:

Fifty grams of 2,3,5,6-tetramethylterephthalic acid was dissolved in 100 ml. of thionyl chloride and the solution refluxed for two hours on a steam bath, after which unreacted thionyl chloride was removed by distillation under aspirator vacuum. The residue was recrystallized from n-hexane. There was obtained 32.5 g. of 2,3,5,6-tetramethylterephthaloyl chloride, M.P. 123° C.

EXAMPLE XVII

A 3 g. sample of 2-(o-aminophenyl)-2,1,3-α,β-naphthotriazole prepared as in Example XIX was dissolved in excess warm acetic anhydride and the solution heated near reflux for 3 hours. The reaction mixture was poured into ice water and allowed to stand for one hour. Filtration yielded 3 g. (86% yield) of 2-(o-N-monoacetamidophenyl)-2,1,3 - α,β - naphthotriazole, melting at 159.2° to 160.6° C.

*Analysis.*—Calcd. for $C_{18}H_{14}N_4O$: C, 71.50%; H, 4.67%; N, 18.53%. Found: C, 71.29%; H, 5.27%; N, 18.35%.

The ultraviolet spectrum of the product was over the range at 347 m$\mu$ of 16,000 and at 278 m$\mu$ of 22,000.

EXAMPLE XVIII

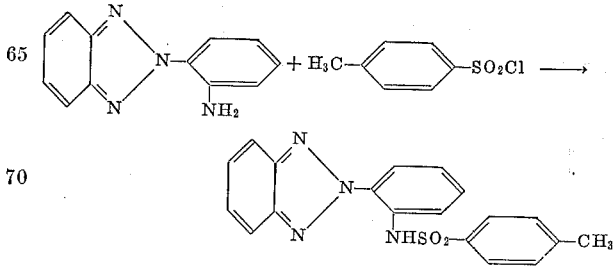

To a solution of 2-(o-aminophenyl)-2,1,3-benzotriazole (5 g.), p-toluenesulfonyl chloride (6 g.), and pyridine (65 ml.) there was added 3.5 g. of triethylamine and the mixture heated on the steam bath for six hours. After standing at room temperature overnight, the mixture was poured into three volumes of ice water and the nearly colorless solid collected by filtration (9.0 g.). Recrystallization from 300 ml. of ethanol, after decolorization with activated carbon, yielded colorless crystals of 2-(o-p-toluenesulfonamidophenyl) - 2,1,3 - benzotriazole, M.P. 160–160.5° C.

The product exhibited absorption maxima at 308 mμ (ε 16,000) and at 222 mμ (ε 28,860).

EXAMPLE XIX

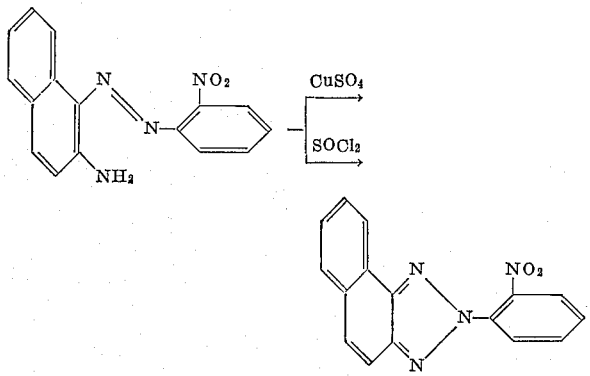

2-(o-nitrophenyl)-2,1,3-α,β-naphthotriazole

*Method I.*—A mixture of 7.5 g. of o-nitrophenylazo-2--naphthylamine, prepared as described subsequently, in 75 ml. of pyridine and 20 g. of anhydrous CuSO₄ was refluxed with rapid stirring for four hours. The cooled reaction mixture was poured into four volumes of water and filtered to obtain a reddish solid (7.2 g.) Recrystallization from 225 ml. of ethanol yielded a crop of yellowish crystals (5.5 g.). An additional 0.75 g. was obtained on dilution of the mother liquor with water (total yield 83%). The product 2-(o-nitrophenyl)-2,1,3-α,β-naphthotriazole melted at 121–122° C.

*Method II.*—To a mixture of o-nitrophenylazo-2-naphthylamine, prepared as described subsequently (5 g.), in 50 ml. of benzene was added 3.0 g. of thionyl chloride. The mixture was heated at reflux with stirring for 18 hours. The now brown-yellow mixture was evaporated to dryness and the solid residue recrystallized from 100 ml. of ethanol. There was obtained 3.5 g. (70%) of 2-(o-nitrophenyl)-2,1,3 - α,β - naphthotriazole, as a pale yellow solid. An additional alcohol recrystallization yielded almost colorless, transparent plates of 2-(o-nitrophenyl)-2,1,3-α,β-naphthotriazole, M.P. 121.8–122.2° C. The spectra of this product were identical to those obtained in Method I.

*Analysis.*—Calcd. for C₁₆H₁₀N₄O₂: C, 66.20%; H, 3.48%; N, 19.3%. Found: C, 66.03%; H, 3.33%; N, 19.58%.

o-Nitrophenylazo-2-naphthylamine was prepared by the method of Meldola, J. Chem. Soc., 58, 372 (1891), by diazotizing reprecipitated o-nitroaniline (27.6 g., 0.2 mole) with 13.0 g. (0.2 mole) of sodium nitrite, filtering, and adding the diazonium solution to a cold, stirred solution of 2-naphthylamine (25 g., 0.18 mole) in dilute hydrochloric acid. The mixture was stirred for one hour, then filtered to collect the dark solid (yield 48 g.). Recrystallization from acetic acid yielded lustrous bronzelike crystals, M.P. 202–202.7° C. (Lit. 198° C.).

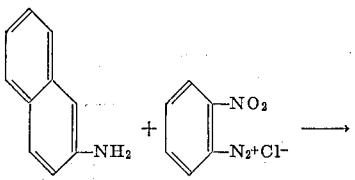

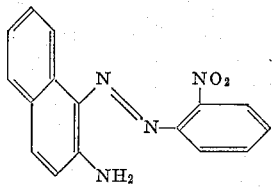

*First method:*

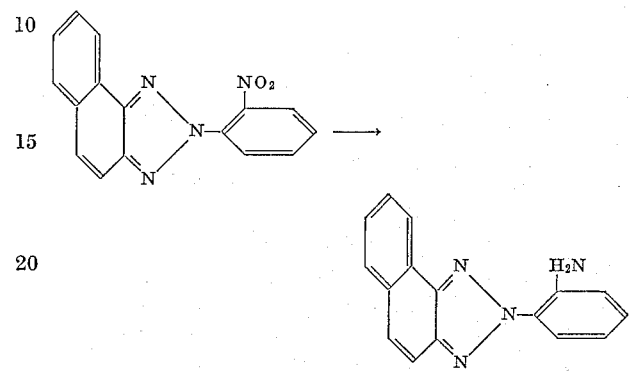

To a hot solution of 5 g. of 2-(o-nitrophenyl)-2,1,3-α, β-naphthotriazole in 150 ml. of glacial acetic acid was added a total of 12 g. of iron powder in three 4-g. portions with stirring over a 30-minute period. The mixture was refluxed for an additional 30 minutes, then filtered hot. The acetic acid filtrate was diluted with water to turbidity, then cooled. A yellow crystalline solid (the amine) separated and was collected by filtration (3.1 g., 69% yield). An additional small amount of product was obtained by retreating the mother liquor with water. The product, 2 - (o - aminophenyl)-2,1,3-α,β-naphthotriazole, after recrystallization from ethanol, melted at 126–127° C.

*Analysis.*—Calcd. for C₁₆H₁₂N₄: C, 73.82%; H, 4.64%; N, 21.53%. Found: C, 74.09%; H, 4.65%; N, 21.72%.

*Second method.*—To a refluxing solution of 32 g. (0.11 mole) of 2-(o-nitrophenyl)-2,1,3-α,β-naphthotriazole in 500 ml. of ethanol was added 108 g. (0.45 mol) of sodium sulfidenonahydrate as a saturated aqueous solution. After the gradual addition had been completed, the stirred mixture was refluxed for two hours. Filtration of the cooled mixture yielded a solid which was washed with water, then dried (23.0 g.). A second crop (7.7 g.) was obtained by concentrating the mother liquor to ⅓ volume. Recrystallization from ethanol gave a 90% yield of the desired amine, which was identical to the product described above (from acetic acid-iron reduction).

EXAMPLE XX

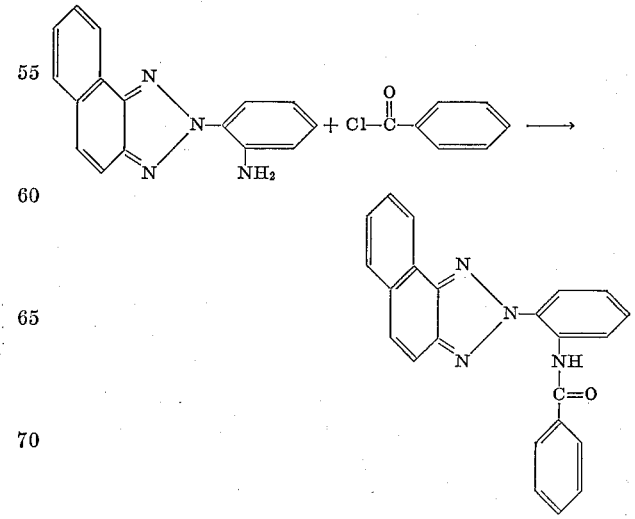

The benzamido derivative of 2-(o-aminophenyl)-2,1,3-α,β-naphthotriazole was prepared by treating a mixture of 1.3 g. (0.005 mole) of 2-(o-aminophenyl)-2,1,3-α,β-naphthotriazole in 10 ml. of 20% sodium hydroxide with 2.5 g. of benzoyl chloride. The crude benzamide was collected by filtration and extracted successively with 200 ml. of boiling ethanol and 20 ml. of dimethylformamide (at 125° C.). The colorless, hairlike, crystalline product (0.9 g.), 2-(o-N-monobenzamidophenyl)-2,1,3-α,β-naphthotriazole melted at 160.5–161.5° C.

*Analysis.*—Calcd. for $C_{23}H_{16}N_4O$: C, 75.81%; H, 4.43%; N, 15.37%. Found: C, 76.05%; H, 4.55%; N, 15.65%.

The ultraviolet spectrum shows maxima at 344 mμ and 268 mμ.

EXAMPLE XXI 2-(o-aminoaphthyl)-2,1,3-benzotriazole was prepared by the following reaction sequence:

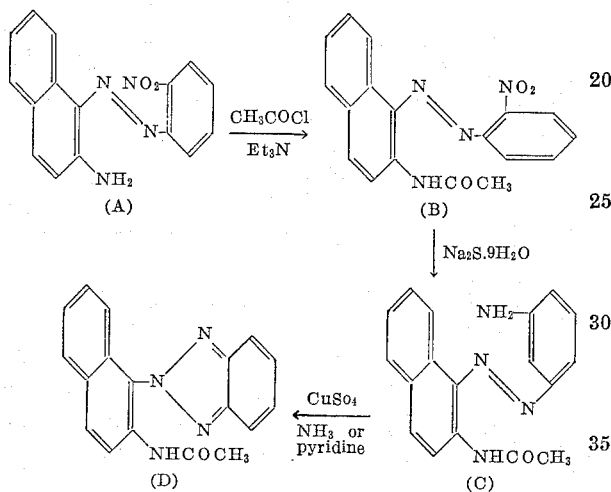

The o-nitrophenylazo 2-naphthylamine (A), prepared as described in Example XIX, was acylated in the usual manner by treating it with a slight excess of acetyl chloride (1.2 equivalent) in the presence of 1–1.5 equivalents of triethylamine.

The acetylated nitro compound (B) was then treated with excess sodium sulfide in ethanol-water to give the corresponding amino derivative (C). The red solid (C) was then dissolved in pyridine and treated with cupric sulfate with heating. The reaction mixture was then diluted with water and extracted with ether. Hydrolysis of the product (D) then gave 2-(o-aminonaphthyl)-2,1,3-benzotriazole as light yellow crystals, M.P. 143° C. The infrared spectrum of the product was in accord with the desired structure.

EXAMPLE XXII

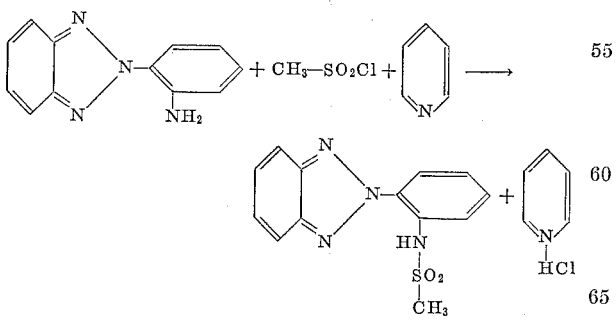

Methanesulfonyl chloride (4.8 g., 0.042 mole) was dropped into an agitated solution of 2-(o-aminophenyl)-2,1,3-benzotriazole (8.4 g., 0.04 mole) in pyridine (100 cc.) at 25–30° C. over a period of seven minutes. After further agitation for 30 minutes at room temperature, the slurry was agitated further and warmed at 56° C. for one hour. The slurry was cooled to room temperature and poured into 500 cc. of agitated distilled water. The slurry was agitated for one hour, the solids were filtered, and washed with water to neutrality. The product was recrystallized twice from 75/25 acetic acid/water (200 cc. each time), once from 95% ethanol (150 cc.), and once from benzene-heptane (150 cc.) with decolorizing carbon (3 g.) treatment. After drying in an oven at 70° C., the near-white solid (5.6 g.) 2-(o-N-monomethanesulfonamidophenyl)-2,1,3-benzotriazole melted at 128–129.5° C. and had the following analysis: C, 55.47, 55.48% (theor. 54.20); H, 4.09, 4.34% (theor. 4.16); N, 18.99, 19.22% (theor. 19.44).

The ultraviolet spectrum of the 2-(o-methanesulfonamidophenyl)-2-1-3-benzotriazole, determined in absolute ethanol, showed maximum absorption in the 300 to 320 mμ range, with an ε at 300 mμ of 16,630 and at 320 mμ of 15,100.

EXAMPLE XXIII

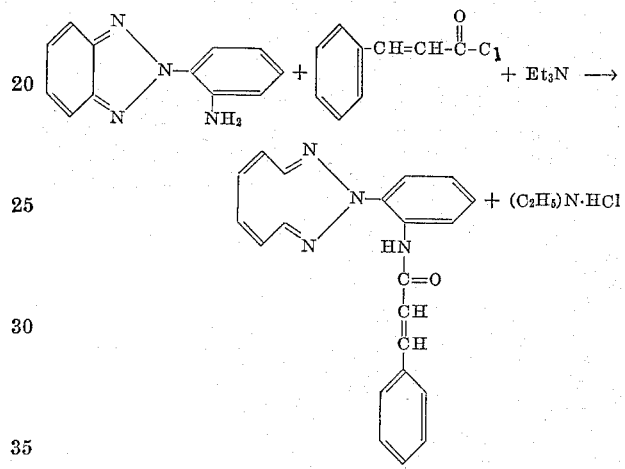

A solution of cinnamoyl chloride (26.7 g., 0.16 mole) in benzene (100 cc.) was added to an agitated solution of 2-(o-aminophenyl)-2,1,3-benzotriazole (33.6 g., 0.16 mole) and triethylamine (18 g., 0.176 mole) in benzene (400 cc.) at 23–30° C. over a period of 30 minutes. The crude amide was collected by filtration and then recrystallized from 200 cc. of 50/50 benzene/cyclohexane, with refluxing in the presence of 40 g. of activated charcoal for one hour and once from 1000 cc. of 95% ethanol. After being dried in a vacuum desiccator over sulfuric acid, the yellow solid, 2-(o-N-monocinnamamidophenyl)-2,1,3-benzotriazole, melted at 130–131° C. and had the following elemental analysis: C, 75.99, 75.15% (theor. 74.10); H, 5.01, 4.76% (theor. 4.72); N, 16.10, 16.25% (theor. 16.46).

The ultraviolet spectrum of the 2-(o-N-monocinnamamidophenyl)-2,1,3-benzotriazole showed ε of 42,300 at 291 mμ.

EXAMPLE XXIV

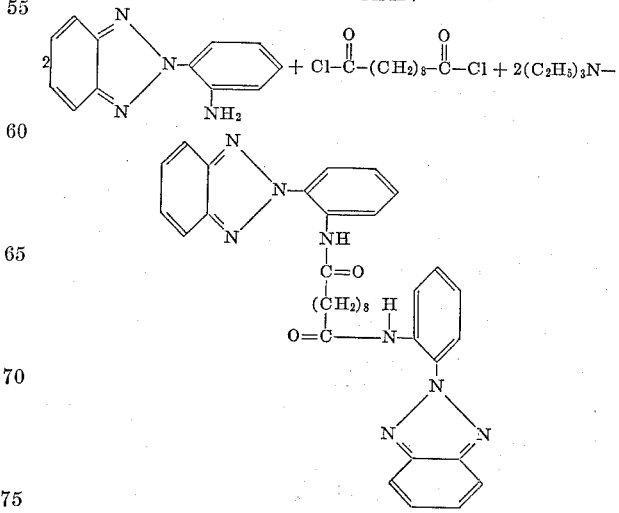

A solution of sebacoyl chloride (38.4 g., 0.16 mole) in methylene chloride (400 cc.) was added to an agitated solution of 2-(o-aminophenyl)-2,1,3-benzotriazole (67.2 g., 0.32 mole) and triethylamine (36 g., 0.352 mole) in methylene chloride (800 cc.) at 20–28° C. over a period of 40 minutes. The thick slurry was stirred at room temperature for an additional three hours, and then allowed to stand overnight. The slurry was added to an equal volume of water, and the mixture agitated on a steam bath until all of the methylene chloride had been removed. The solid product was removed by filtration and the product washed successively with distilled water (500 cc.), 0.5% hydrochloric acid (500 cc.), and finally four times with distilled water, using 500-cc. portions each time. The crude product was then recrystallized from 1500 cc. of dioxane. The product thus obtained was placed in 4000 cc. of benzene containing 40 g. of decolorizing carbon and the mixture refluxed for one hour. The solution was filtered, and the cream-colored product which separated upon cooling of the filtrate, which amounted to 61.2 g., was dried in a 100° C. oven. The product, bis[2-(o-sebacamidophenyl)-2,1,3-benzotriazole], melted at 171° C. and analyzed: C, 70.03% (theor. 69.62%); H, 6.36, 6.28% (theor. 5.80%); N, 18.71, 18.83% (theor. 19.11%).

The ultraviolet spectrum of the product was over a broad range with an ε at 350 mμ of 12,900, at 340 mμ of 21,600, at 321 mμ of 29,300, and at 290 mμ of 29,600.

The above experiment is repeated using one equivalent portion of sebacoyl chloride to produce 2-(o-N-monosebacamidophenyl)-2,1,3-benzotriazole. Esterification of the carboxyl group in this benzotriazole with an alkanol, e.g., butanol, readily yields the corresponding mono-butyl ester of this invention.

EXAMPLE XXV

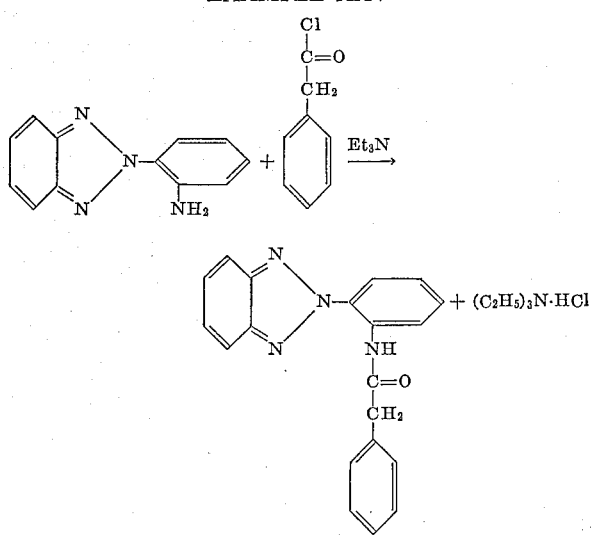

Phenylacetyl chloride (54.6 g., 0.35 mole) was added to an agitated solution of 2-(o-aminophenyl)-2,1,3-benzotriazole (67.2 g., 0.32 mole) and triethylamine (35.6 g., 0.35 mole) in dry tetrahydrofuran at 25–30° C. over a period of 33 minutes. The slurry became so viscous that an additional 200 cc. of tetrahydrofuran was added. After standing overnight, the slurry was poured into two liters of agitated distilled water. This slurry was filtered, and the filter cake was washed with 0.5% hydrochloric acid, followed by distilled water to a negative chloride test. The damp crude product was recrystallized initially from 1500 cc. of 95% ethanol and then twice from cyclohexane (2000 cc. each time), with activated carbon (20 g.) treatments each time. After being dried in a vacuum desiccator over paraffin shavings, the fluffy white solid melted at 144–145° C. and had the following elemental analysis: C, 73.40, 73.54% (theor. 73.19%); H, 5.00, 4.72% (theor. 4.87%); N, 16.85, 16.95% (theor. 17.07%).

The ultraviolet spectrum of 2-(o-N-monophenacetamido phenyl)-2,1,3-benzotriazole, determined in absolute ethanol, showed maximum absorption at 301.5 mμ with an ε of 15,900.

EXAMPLE XXVI

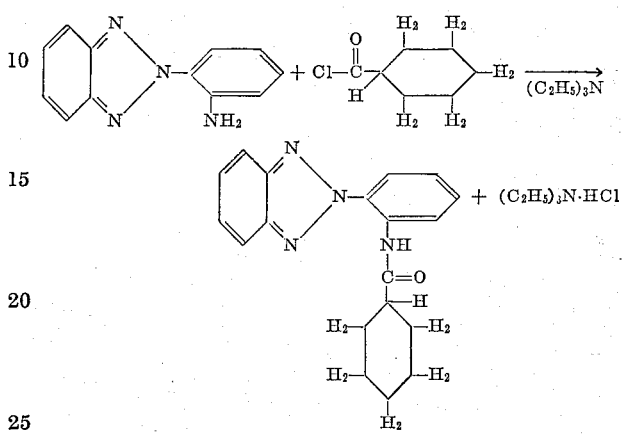

A solution of 2-(o-aminophenyl)-2,1,3-benzotriazole (29.4 g., 0.14 mole) and triethylamine (15 g., 0.155 mole) in 400 cc. of benzene was agitated at room temperature. A solution of hexahydrobenzoyl chloride (26.2 g., 0.14 mole) in benzene (50 cc.) was added to the stirred solutions at 24° to 30° C. over a period of 30 minutes. The reaction mixture was stirred for an additional two hours at room temperature and then allowed to stand overnight. The amine hydrochloride was removed by filtration and the benzene solution washed with 0.5% hydrochloric acid, followed by distilled water to neutrality. The crude 2-(o-hexahydrobenzamidophenyl)-2,1,3-benzotriazole was recrystallized once from 95% ethanol (400 cc.) and twice from cyclohexane (200 cc. first time and 180 cc. second time). After drying over paraffin in a vacuum desiccator, the cream-colored 2-(o-N-monohexahydrobenzamidophenyl)-2,1,3-benzotriazole (32 g.) melted at 117° to 118° C. and analyzed C, 72.36%, 72.14% (theor. 71.25%); H, 7.19%, 6.90% (theor. 6.26%); and N, 17.38%, 17.53% (theor 17.49%).

EXAMPLE XXVII

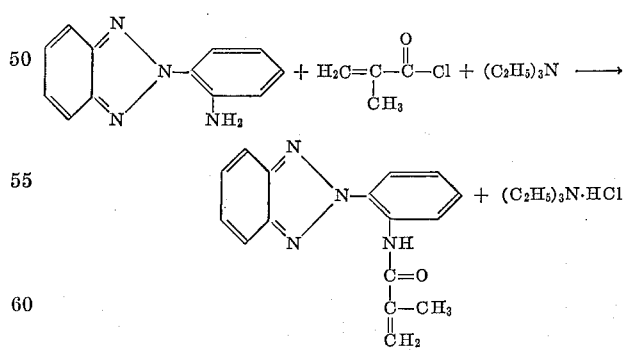

Commercial methacrylyl chloride was freed of stabilizer by distillation at atmospheric pressure into an ice-packed receiver. The methacrylyl chloride thus obtained (33.4 g., 0.32 mole) was added to an agitated solution of 2-(o-aminophenyl)-2,1,3-benzotriazole (67.2 g., 0.32 mole) and triethylamine (36 g., 0.352 mole) in dry tetrahydrofuran (dried initially over sodium hydroxide pellets and finally over calcium hydride) at 25–34° C. The slurry was agitated two additional hours, allowed to stand overnight, poured into 1200 cc. of distilled water, and then agitated for 30 minutes. The crude yellow needles which formed were removed by filtration, the slurry washed first with distilled water, then with 0.5%

HCl, and finally with distilled water to a negative chloride test. The damp yellow crude product was recrystallized initially from 200 cc. of 95% ethanol and then three times from cyclohexane. After being dried in a vacuum desiccator over paraffin shavings and $P_2O_5$, the cream-colored 2-(o-N-monomethacrylamidophenyl)-2,1,3-benzotriazole (34 g.) melted at 90–91° C. and had the following elemental analysis: C, 69.25, 69.29% (theor. 68.80%); H, 5.60, 5.41% (theor. 5.38%); N, 20.36, 20.42% (theor. 20.09%).

The ultraviolet spectrum determined in absolute ethanol showed extinction coefficients in the region of maximum absorption at 340 m$\mu$ ($\epsilon$ 11,160), at 319 m$\mu$ ($\epsilon$ 15,500), at 304 m$\mu$ ($\epsilon$ 16,450), at 276 m$\mu$ ($\epsilon$ 14,500).

EXAMPLE XXVIII

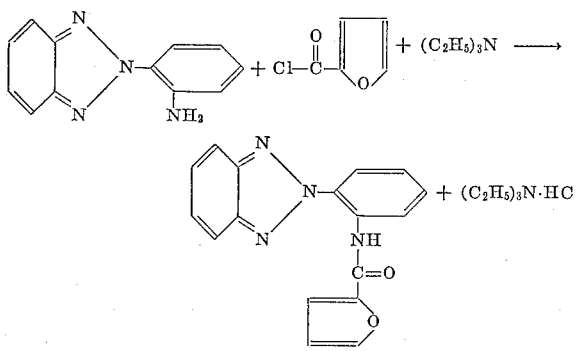

A solution of 2-(o-aminophenyl)-2,1,3-benzotriazole (8.4 g., 0.04 mole) and triethylamine (4.5 g., 0.044 mole) in 500 cc. of benzene was agitated at room temperature. A solution of 2-furoyl chloride (5.5 g., 0.04 mole) in benzene (13 cc.) was added to the stirred solution at 24° to 30° C. over a period of 30 minutes. The reaction mixture was stirred an additional two hours at room temperature and allowed to stand overnight. The amine hydrochloride was removed by filtration and the benzene solution was then treated with 0.5% hydrochloric acid, followed by distilled water to neutrality. The benzene solution, after drying over anhydrous sodium sulfate, was refluxed for an hour with 5 grams of activated carbon. The benzene was then removed by distillation at reduced pressure. The crude product was recrystallized once from 500 cc. of heptane, twice from 300 cc. of 95% ethanol, each time with 4 g. of activated carbon, once from 2500 cc. of ethanol without activated carbon, and once from 300 cc. of cyclohexane without activated carbon. After drying, the 2-(o-N-monofuramidophenyl)-2,1,3-benzotriazole analyzed: C, 68.02, 67.96% (theor. 67.20%); H, 3.60, 3.85% (theor. 3.95%); N, 18.44% (theor. 18.42%).

EXAMPLE XXIX

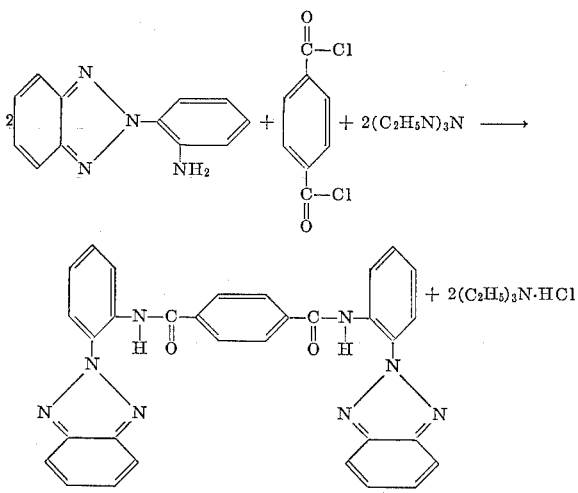

A solution of terephthaloyl chloride (24.4 g., 0.12 mole) in methylene chloride (300 cc.) was added to an agitated solution of 2-(o-aminophenyl)-2,1,3-benzotriazole (50.4 g., 0.24 mole) and triethylamine (27 g., 0.264 mole) in methylene chloride (600 cc.), at 20–28° C., over a period of 40 minutes. The thick yellow slurry was stirred at room temperature for an additional three hours and allowed to stand overnight. The slurry was added to an equal volume of water, and the mixture agitated on a steam bath until the methylene chloride had been removed by evaporation. The yellow solid thus obtained was removed by filtration, and the slurry washed once with distilled water (500 cc.), once with 0.5% HCl (500 cc.), once with 5% $NaHCO_3$ (500 cc.), once again with 0.5% HCl (500 cc.), and finally four times with distilled water (500 cc. each time). One-half of the terephthalamide was recrystallized from 2200 cc. of dimethylacetamide. The other half was crystallized from the 2200 cc. of dimethylacetamide mother liquor. These two portions were combined and crystallized from two liters of dimethyl sulfoxide. The wet cake was washed with three 250-cc. portions of 95% ethanol, and the product was dried in a vacuum desiccator over sulfuric acid. The product, bis[2-(o-terephthalamidophenyl)-2,1,3-benzotriazole] (47 g. of very small yellow needles), melted on the Banderkamp block at 280–285° C., and the melt repeatedly froze sharply at 285° C. Elemental analysis was as follows: C, 71.45, 71.58% (theor. 69.80%); H, 5.04, 4.75% (theor. 4.00%); N, 20.27, 20.04% (theor. 20.38%).

The above experiment is repeated using one equivalent of terephthaloyl chloride to produce 2-(o-N-monoterephthalamidophenyl)-2,1,3-benzotriazole.

When phthaloyl chloride is substituted for terephthaloyl chloride in the above example, the 2:1 or 1:1 product will be obtained depending on whether two or one equivalent portion of the acid chloride is employed.

Esterification of the carboxyl group in the above N-monoterephthaloylamino- and N-monophthaloylamido derivatives with an alkanol, e.g., hexanol, will in each instance yield the corresponding ester of this invention.

EXAMPLE XXX

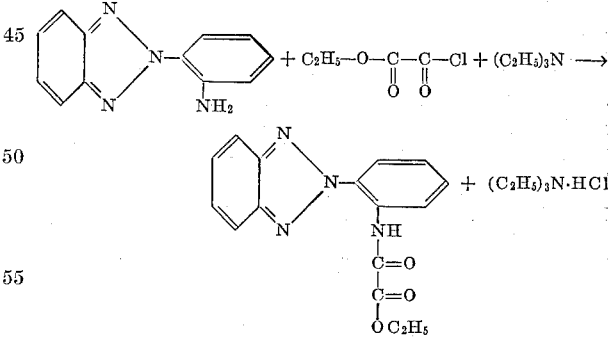

A solution of ethyloxalyl chloride (9.0 g., 0.066 mole) in methylene chloride (25 cc.) was added to a solution of 2-(o-aminophenyl)-2,1,3-benzotriazole (13.8 g., 0.0658 mole) and triethylamine (7.4 g., 0.0726 mole) in methylene chloride (200 cc.) at 21–30° C. over a period of 20 minutes. The mixture was stirred further for 2½ hours and allowed to stand overnight. Sufficient additional methylene chloride was added to dissolve the solids in the reaction mixture completely. The solution was washed with 0.5% HCl and then with distilled water to neutrality, dried over anhydrous $Na_2SO_4$, and the solvent removed at reduced pressure. The crude product was recrystallized once from cyclohexane (800 cc.) with activated carbon (16 g.) treatment, once from 50/50 water/dioxane (500 cc.), once again from cyclohexane (600 cc.) with activated carbon (12 g.) treatment, and finally from cyclohexane (600 cc.) without activated carbon. After drying in a vacuum desiccator over paraffin shavings, the cream solid, ethyl 2-(o-N-monooxamidophenyl) - 2,1,3 - benzotriazole (4.5 g.) melted at 137–138° C. and had the following elemental analysis: C, 62.22, 62.14% (theor. 61.92%); H, 4.76, 4.94% (theor. 4.52%), N, 18.25, 18.52% (theor. 18.08%).

EXAMPLE XXXI

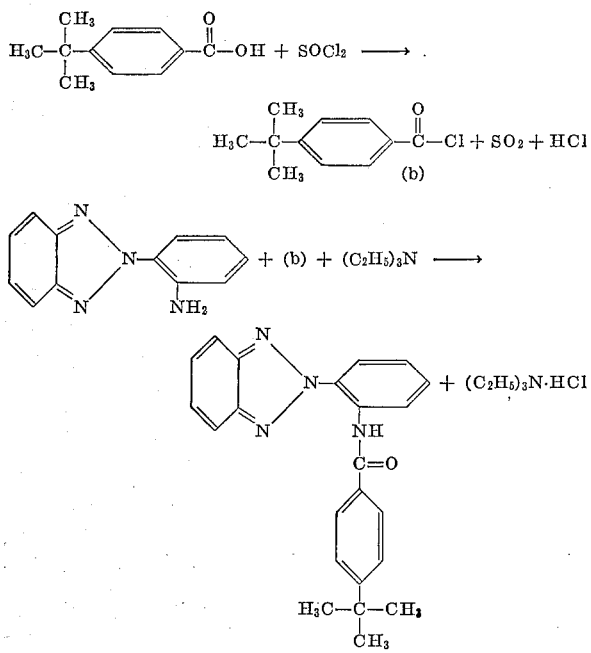

p-Tert-butylbenzoic acid (89 g., 0.53 mole) and thionyl chloride (126 g., 1.06 mole) were agitated together at room temperature for 18 hours and refluxed for one hour. Excess thionyl chloride was stripped from the clear solution, and the colorless product boiling at 127° C., 11 mm., was obtained by distillation.

A solution of 2-(o-aminophenyl)-2,1,3-benzotriazole (33.6 g., 0.16 mole) and triethylamine (18 g., 0.176 mole) in one liter of benzene was agitated at room temperature. A solution of the p-tert-butylbenzoyl chloride, prepared as above (37.92 g., 0.16 mole), in benzene (50 cc.) was added to the stirring solution at 24° to 30° C. over a period of 30 minutes. Following the procedure described in Example XXVIII there was obtained 40 g. of 2-(o-N-mono-p-tert-butylbenzamidophenyl)-2,1,3-benzotriazole. The crude product was recrystallized twice from cyclohexane (200 cc. each time). After drying in a vacuum desiccator over paraffin shavings, the product, 37.5 g., melted at 125° C. to 126° C. and analyzed: C, 75.22, 75.12% (theor. 74.70%); H, 6.36, 6.32% (theor. 5.95%); and N, 14.83, 14.87% (theor. 15.13%).

EXAMPLE XXXII

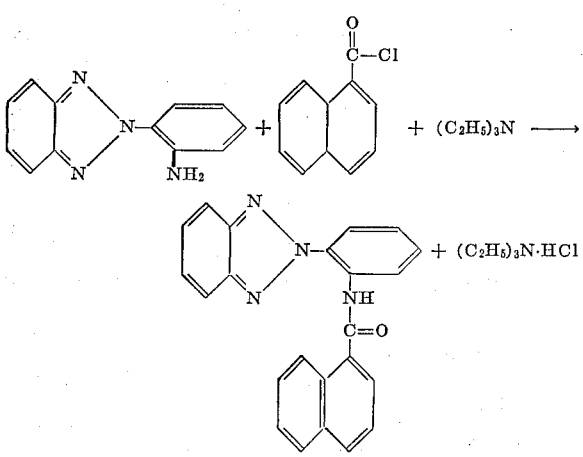

A solution of 2-(o-aminophenyl)-2,1,3-benzotriazole (8.4 g., 0.04 mole) and triethylamine (4.5 g., 0.44 mole) in 500 cc. of benzene was agitated at room temperature. A solution of 1-naphthoyl chloride (9.24 g., 0.04 mole) in benzene (13 cc.) was added to the stirred solution at 24° to 30° C. over a period of 30 minutes. The reaction mixture was stirred an additional two hours at room temperature and then allowed to stand overnight. The crude 2-(o - N-mono-1-naphthamidophenyl)-2,1,3-benzotriazole obtained was crystallized from one liter of heptane. Two crops of crystals were recovered, combined, and recrystallized from 350 cc. of cyclohexane. After drying in a vacuum desiccator over paraffin shavings, the white, fluffy solid (6.9 g.) melted at 149° to 150° C. and analyzed: C, 76.43, 76.20% (theor. 75.85%); H, 4.78%, 4.72%; N, 15.47%, 15.25%.

EXAMPLE XXXIII

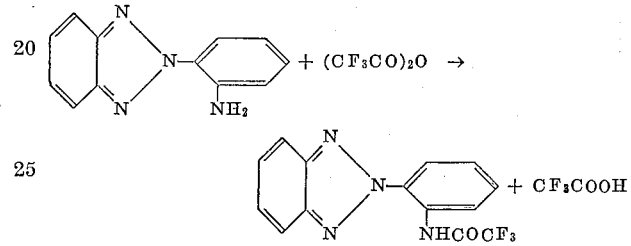

Trifluoroacetic anhydride (8.82 g., 0.042 mole) was dropped into an agitated solution of 2-(o-aminophenyl)-2,1,3-benzotriazole (8.4 g., 0.04 mole) in benzene (100 cc.) at 24–30° C., over a period of ten minutes. Sufficient additional benzene was added to thin the slurry formed, and stirring was continued for one hour. Sufficient benzene was added to dissolve all of the solids in the reaction mixture. The benzene solution was washed to neutrality with distilled water, and the solvent was removed at reduced pressure. The crude product was recrystallized once from 95% ethanol (500 cc.), once from heptane (1000 cc.) with char [1] (20 g.) treatment, and once from heptane (1000 cc.) without char [1] treatment. The off-white needles (7 g.) melted at 167° C. and had the following elemental analysis: C, 55.48, 55.52% (theor. 54.91%); H, 3.52, 3.43% (theor. 2.94%); N, 18.49, 18.78% (theor. 18.30%).

The ultraviolet spectrum of trifluoroacetyl derivative of 2-(o-aminophenyl)-2,1,3-benzotriazole, determined in absolute ethanol, showed maximum absorption at 307 m$\mu$, with an $\epsilon$ of 20,900.

EXAMPLES XXXIV—XXXVI

The phosphonic acid amides of this invention are prepared by the same method as the corresponding carbacyl and sulfonyl derivatives. Thus, the acylating agents listed in the left column of Table II are equivalent to and may be substituted for acetic anhydride in the process of Example I or for methanesulfonyl chloride in the process of Example XXII to yield the products in the right column of Table II.

TABLE II

| Example | Reactant | Product |
|---|---|---|
| XXXIV | Methanephosphonyl chloride. | 2-(o-N-monomethanephosphonamidophenyl)-2,1,3-benzotriazole. |
| XXXV | Butanephosphonyl bromide. | 2-(o-N-monobutanephosphonamidophenyl)-2,1,3-benzotriazole. |
| XXXVI | Methylhexanephosphonyl chloride. | 2-(o-N-monomethylhexanephosphonamidophenyl)-2,1,3-benzotriazole. |

The following Examples XXXVII–XXXXVIII illustrate the preparation of substituted 2-(o-aminophenyl)-2,1,3-benzotriazoles wherein the substituents appear on the phenyl or benzo rings.

---
[1] Activated carbon.

EXAMPLE XXXVII

To a stirred solution of 5 g. of lithium aluminum hydride in 75 ml. of tetrahydrofuran there was added slowly a solution of 2 g. of dibenzo-1,3a,4,6a-tetraazapentalene in 300 ml. of tetrahydrofuran. The mixture was stirred at 25° C. for one hour and at reflux for four hours. The cooled mixture was then carefully poured into cold water and extracted with methylene chloride. Evaporation of the solvent yielded a yellow crystalline solid, melting at 93° C. This material was identical to the 2-(o-aminophenyl)-2,1,3-benzotriazole prepared as in Examples I and II.

The above example is repeated using the dichloro derivative of dibenzo-1,3a,4,6a-tetraazapentalene containing one chlorine on each benzene nucleus in a position which is non-adjacent to the heterocyclic residue in place of the dibenzo-1,3a,4,6a-tetraazapentalene to produce 2-(o - amino - p - chlorophenyl)-5(6?)-chloro-2,1,3-benzotriazole, whose formula is:

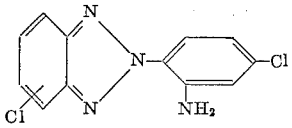

When the above example is repeated using the trisulfo derivative of dibenzo-1,3a,4,6a-tetraazapentalene (i.e., the two benzo rings carry a total of three sulfo groups), a 2-(o-aminophenyl)-2,1,3-benzotriazole in which the 2-aryl ring and the benzo ring carry a total of three sulfo groups is obtained.

EXAMPLE XXXVIII

To a 1-g. sample of 2-(o-aminophenyl)-2,1,3-benzotriazole, prepared as in Example I or II, there was added 10 ml. of fuming sulfuric acid at room temperature over a 10-minute period, the mixture was then placed on a steam bath and heated for 10 minutes longer. The reaction mixture was allowed to cool to ambient temperature, and then poured into 10 volumes of ice water. The solid which precipitates was collected by filtration, washed with cold water, and then treated with 20% aqueous sodium hydroxide. The mixture was then cooled and the solid which separated was removed by filtration. The yield was 1.1 g. Recrystallization of this solid from ethanol gave a yellow crystalline product, 2-(o-aminophenyl) - 2,1,3-benzotriazole·$x$·sodium sulfonate. This product analyzed:

Calcd. for $C_{12}H_9N_4SO_3Na \cdot H_2O$: C, 42.63%; H, 3.36%; S, 9.71%. Found: C, 49.92%; H, 3.73%; S, 9.83%.

Hydrolysis of the above sulfonate with hydrochloric acid readily yields the corresponding benzotriazole sulfonic acid.

EXAMPLE XXXIX

A solution of 1.0 g. of 2-(o-aminophenyl)-2,1,3-benzotriazole in 25 ml. of glacial acetic acid was treated dropwise with bromine, with stirring after each addition, until the bromine color was no longer discharged. The reaction mixture, which contains appreciable solid product, was poured into 10 volumes of water. Filtration yielded 2.2 g. of yellow solid, which was recrystallized from ethyl acetate. The recrystallized product melted at 169–170° C. and analyzed for the dibromo derivative of 2-(o-aminophenyl)-2,1,3-benzotriazole as follows:

Calcd. for $C_{12}H_8N_4Br_2$: C, 39.14%; H, 2.19%; N, 15.22%. Found: C, 40.01%; H, 2.05%; N, 15.76%.

Treatment of the dichloro or dibromo derivatives of 2-(o-aminophenyl)-2,1,3-benzotriazole (prepared as in Examples XXXVII and XXXIX, respectively) with $Cu(CN)_2$ at a temperature of about 200° C. yields the corresponding dicyano derivative in each instance. Hydrolysis of the respective dicyano derivatives with aqueous hydrochloric acid readily yields the corresponding dicarboxy-substituted 2-(o-aminophenyl)-2,1,3-benzotriazole.

EXAMPLES XXXX–XXXXIII

As was disclosed above, 2-(o-aminophenyl)-2,1,3-benzotriazoles wherein the phenyl and/or benzo ring bears alkyl and/or alkoxy groups are easily prepared by oxidizing the appropriately substituted o,o'-diaminoazobenzene. Thus, the reactants listed in the left column of Table III are equivalent to and may be substituted for o,o'-diaminoazobenzene in the process of Example I for preparing the 2-(o-amino) compound to yield the products in the right column of Table III.

TABLE III

| Example | Reactant | Product |
|---|---|---|
| XXXX | o,o'-Diamino-m,m'-dimethylazobenzene. | 2-(o-amino-m-methylphenyl)-4-methyl-2,1,3-benzotriazole. |
| XXXXI | o,o'-Diamino-p-ethoxyazobenzene. | 2-(o-amino-p-ethoxyphenyl)-2,1,3-benzotriazole and 2-(o-aminophenyl)-5-ethoxy-2,1,3-benzotriazole. |
| XXXXII | o,o'-Diamino-m-butoxyazobenzene. | 2-(o-amino-m-butoxyphenyl)-2,1,3-benzotriazole and 2-(o-aminophenyl)-4-butoxy-2,1,3-benzotriazole. |
| XXXXIII | o,o-Diamino-p-hexylazobenzene. | 2-(o-amino-p-hexylphenyl)-2,1,3-benzotriazole and 2-(o-aminophenyl)-5-hexyl-2,1,3-benzotriazole. |

The products of Examples XXXVII–XXXXIII may be used in the examples of this invention to prepare the desired acyl products containing R' and R'' substituents.

EXAMPLE XXXXIV

To a solution of 2.1 g. of 2-(o-aminophenyl)-2,1,3-benzotriazole, prepared as in Example I, in 20 ml. of tetrahydrofuran containing 2 ml. of triethylamine was added a solution of 2,3-dichloroquinoxaline-6-carbonyl chloride (2.6 g.) in tetrahydrofuran. A yellow solid precipitated almost immediately. The mixture was heated intermittently (below 80° C.) for one hour, filtered while still hot, and the insoluble solid triturated with water to remove triethylamine hydrochloride. The remaining yellow solid was dried (2.2 g.). The tetrahydrofuran mother liquid was treated with activated carbon and filtered while hot. On cooling, a yellow crystalline product, having an infrared spectrum similar to that of the insoluble yellow solid above, separated and was collected. It had a melting point of 210°–212° C.

Analysis.—Calcd. for $C_{21}H_{12}Cl_2N_6O$: C, 58.0; H, 2.8; N, 19.3; Cl, 16.3. Found: C. 57.7; H, 3.2; N, 19.9; Cl, 16.4.

Preferred R' and R'' substituents are fluorine, chlorine, bromine, lower alkyl, lower alkoxy, sulfo, sodium sulfo salt, nitro, carboxy, and cyano. Especially preferred are the benzotriazoles containing R' and R'' groups in which said groups are carboxy or lower alkyl and each of $m$ and $n$ is 1. When R' and R'' are substituents other than carboxy, then $m$ and $n$ can be up to 4, but preferably is not more than 2.

As stated previously, the acylamides of this invention are of three types, viz., carbonamides, sulfonamides, and phosphonamides. Of these, the preferred are the carbonamides and sulfonamides. Especially preferred are the carbonamides of sterically hindered carboxylic acids, carbonamides, of $\alpha,\beta$-ethylenically unsaturated monocarboxylic acids, and the sulfonamides of lower alkyl sulfonic acids.

Because the acylating agents necessary to prepare them are more readily available, R''' and $R^{IV}$ are preferably alkyl of 1 to 12 carbons, mono-unsaturated alkenyl of 2–12 carbons, unsubstituted and alkylsubstituted aryl of 6–10 ring carbon atoms, alkaryl of 7–12 carbons, and halogen-substituted alkyl or aromatic hydrocarbon groups of 6–10 ring carbons where the halogens are of atomic number 9–35, and the previously named hydrocarbon groups having an o-[2(2,1,3 - benzotriazolyl)] - phenyliminocarbonyl substituent. $R^{IV}$ is most preferably alkyl of no more than 12 carbon atoms.

The compounds of this invention are useful as photostabilizers for modified natural polymers, addition and condensation polymers and copolymers, and mixtures of modified natural polymers. Examples of condensation polymers are the macromolecular polyesters, polyamides, polycarbonates, and polyurethanes, and examples of addition polymers are polyethylene, polypropylene, polystyrene, polyvinyl chloride, polyvinyl fluoride, polyvinylidene fluoride, polyvinyl acetate, propionate, and butyrate, polyacrylonitrile, polymethacrylonitrile, polymethyl acrylate and methacrylate, copolymers of ethylene with such other polymerizable monomers as carbon monoxide, vinyl acetate, vinyl chloride, acrylo- and methacrylonitrile, methyl acrylate and methacrylate, acrylic and methacrylic acids, maleic and fumaric acids, and the like, copolymers of styrene with the aforementioned monomers, polyvinylpyrrolidone, polyvinyl succinimide, polyvinyltrimethyl acetate, and the like. Examples of modified natural polymers are nitrocellulose, cellulose acetate, propionate, and butyrate, regenerated cellulose, and the like. Such modified polymers are a part of this invention.

The amount of the amide employed is usually less than about 10% by weight, and generally from 0.01 to about 5% by weight.

The method by which the amide is incorporated into the polymer is not critical and any method may be used. Thus, the amide may be added before, during, or after polymerization, or before or during spinning, or it can be added to fiber, film or finished product. Irrespective of how the subject aryltriazoles are incorporated into the polymer, they become an integral part of the polymer, chemically or physically.

When the benzotriazole is used as a partial or complete replacement for a component in a condensation polymer, it is to be understood that it is then employed in an amount equal to that required to form the polymer. In the case of addition polymers and polymerizable unsaturated acid derivatives of the 2-(o-aminophenyl)-2,1,3-benzotriazoles, i.e., where R''' in R'''CO- is alkenyl in which the ethylenic unsaturation is $\alpha,\beta$ with respect to the carbonyl group, as in acrylic or methacrylic acids, the monomers can be mixed and then copolymerized or the $\alpha,\beta$-ethylenically unsaturated carboxylic acid amide can be polymerized separately and added to preformed polymer. Also, the monomeric $\alpha,\beta$-ethylenically unsaturated carboxylic acid amide can be added to preformed polymer and graft polymerized thereon, by conventional techniques, as through the use of high energy radiation or thermal initiation. In the case of copolymers of ethylene with $\alpha,\beta$-ethylenically unsaturated carboxylic acids or esters, it is preferred to convert the acid or ester copolymer to the acid halide, as by reaction with thionyl chloride, and then treat the acid chloride with the 2-(o-aminophenyl)-2,1,3-benzotriazole.

The following examples illustrate the utility of the compounds of this invention:

EXAMPLE A

The experiment described herein demonstrates the photostability and nonfluorescence or weak fluorescence of the amides of this invention. Of special interest as photostabilizers are the alkyl carbonamides and the alkyl sulfonamides containing from 1 to 12 carbon atoms in the alkyl chain, because of their unexpectedly high degree of photostability and their nonfluorescence or weak fluorescence. The property of fluorescence is a general indication that a material will not have sufficient photostability to be useful as an ultraviolet screener. Moreover, fluorescence brings about shade changes in dyed products at concentrations typical in ultraviolet light screener use and hence is a highly undesirable characteristic. Their photostability makes these amides useful commercially as photostabilizers for polymers, dyestuffs, and other materials susceptible to degradation by light.

Measurements of photostability

Each subject sample was dissolved in a separate solution of dimethylformamide and an acrylonitrile terpolymer, the latter being a product prepared as described in U.S. Patent 2,837,501. From these solutions films were cast having the following approximate properties: (1) thickness was about 0.001 inch; (2) weight of the sample used was about 0.5% weight of the polymer; (3) optical density at the long wave length absorption maximum of the sample was about 1.0. Each film was irradiated at room temperature in air with a high-pressure $10^3$ watt Xe lamp sold commercially as Osram XBO 1001. Optical filters were used which allowed only a band of wave length near the long wave length absorption maximum of the sample to be transmitted from lamp to film. The photolysis wave lengths were in the range of those present in the ultraviolet region of sunlight. The number of quanta per unit time absorbed by the sample was determined by standard uranyl oxalate actinometry. It was found that the optical density of the sample descreased linearly with absorbed dose. From these data a quantum yield was determined for the loss of optical absorption in the considered wave length range. In the tables below these data are expressed in units corresponding to the average number of quanta absorbed by a sample molecule before its absorption in this wave length range is lost. Thus large numbers indicate high photostability.

Measurements of fluorescence yield

Each sample was prepared as above and the film mounted in the entrance slit of a small grating monochromator. The 2537 A. line from a low-pressure Hg lamp was isolated by chemical filters and focused upon the sample. The fluorescence emission thus stimulated was dispersed by the mono-chromator, detected by a photomultiplier having S–13 cathode response and the resultant signal amplified and displayed upon a chart recorded. It was thus possible to obtain the fluorescence spectrum of each sample. Upon integrating the area under such a spectrum under standard instrumental conditions and making correction for the percentage of exciting light absorbed, values for the relative fluorescence quantum yields of the samples, i.e., relative number of quanta emitted in fluorescence per quantum absorbed, were derived. These data may be converted to absolute values by comparison of these spectra with the spectrum of a standard sample (cf. W. H. Melhuish, J. Phys. Chem. 64, 762 (1960)). Such a comparison was made and absolute values for fluorescence yields are quoted in the tables below.

Following the procedures set forth immediately above, the results shown in Table IV were obtained. Column I of the table names the subject sample used in the above procedures. The second and third columns list the photostability and fluorescence yield, respectively, for each subject sample.

TABLE IV

| Compound | Photostability | Fluorescence Yield |
| --- | --- | --- |
| Phenyl-2,1,3-benzotriazole | 3,100 | 0.56 |
| 2-(o-N-monoacetamidophenyl)-2,1,3-benzotriazole | 13,000 | 0.007 |
| 2-(m-N-monoacetamidophenyl)-2,1,3-benzotriazole | 350 | 0.32 |
| 2-(p-N-monoacetamidophenyl)-2,1,3-benzotriazole | 450 | 0.40 |
| 2-(o-N-monopivalamidophenyl)-2,1,3-benzotriazole | 120,000 | 0.005 |
| 2-(o-N-monomethanesulfonamido)-2,1,3-benzotriazole | 1,000,000 | $\geq 0.002$ |

From the above table it can be seen that the basic, i.e., the unsubstituted phenylbenzotriazole has a fluorescence yield which is essentially the same as that of the m- and p-amidophenylbenzotriazoles but that it has higher photostability. This means that introducing the amido group into the m- and p-positions has decreased photostability without essentially changing fluorescence yield. On the other hand, introducing the amido group into the o-position has increased photostability and decreased fluorescence yield. This is an entirely unexpected result which could not have been predicted by such studies carried out on a mixture of the individual compounds. Moreover, the meta and para acetamidophenylbenzotriazoles or any mixture containing these isomers would impart a strong visible fluorescence to polymers when used at concentrations typical for screener use and could result in a shade change of the final dyed product. In contrast the 2-(o-N-monoacetamidophenyl)-2,1,3-benzotriazole is so weakly fluorescent that this property is unimportant in this respect, when the compound is used as an ultraviolet light absorber.

The data in Table IV also shows that the 2-(o-N-monomethanesulfonamidophenyl)-2,1,3-benzotriazole possesses dramatically high photostability and, concomitantly extremely low fluorescence yield. These remarkable properties make this product highly useful as an ultraviolet screener.

Furthermore, Table IV discloses that amides of acids containing a sterically hindered carboxyl group have markedly higher photostabilities than amides of acids in which the carboxyl group is not sterically hindered (compare the pivalamido compound with the o-acetamido compound). The high degree of photostability of the aforementioned ortho-amidophenylbenzotriazoles makes these compounds highly useful as ultraviolet light screeners. Thus, the amides of acids having sterically hindered carboxyl groups and the amides of alkylsulfonic acids constitute one preferred embodiment of the invention.

"Sterically hindered carboxyl" is used herein in the accepted meaning, e.g., as in R. C. Fuson's "Advanced Organic Chemistry," John Wiley & Sons, Inc., New York (1950) pages 395 and 396.

EXAMPLE B

In this example the benzotriazole is incorporated into the polymer structure by copolymerization. This example demonstrates the effectiveness of these compounds as photostabilizers when thus used.

A 300-ml. pressure vessel containing 112 ml. of benzene, 0.15 ml. of di-tert-butyl peroxide, and 1.0 g. of 2-(o-acrylamidophenyl)-2,1,3-benzotriazole was pressured to 3500 lb./sq. in. with ethylene at 24° C. The charge was then heated with agitation to 130° C. The pressure within the reactor was then 12,500 lb./sq. in. Whenever the pressure within the reactor dropped to 12,000 lb./sq. in., an additional 500 lb./sq. in. pressure of ethylene was added. The yield of copolymer was 15 grams; inherent viscosity, 1.36 at 0.1% concentration in α-chloronaphthalene at 125° C. The copolymer contained about 6 weight percent of recurring acrylamidophenylbenzotriazole units. Four-mil thick films were melt-pressed from this copolymer and from molding grade, medium density polyethylene. The films containing the benzotriazole lasted more than twice as long as the films from the polyethylene control, when subjected to accelerated weathering in an Atlas Weather-Ometer.[2]

A copolymer of ethylene and 2-(o-monomethacrylamidophenyl)-2,1,3-benzotriazole may be prepared in the same manner.

EXAMPLE C 2-(o-N-monocamphoramidophenyl) - 2,1,3 - benzotriazole, prepared as in Example XIV, was melt blended with a polyamide from hexamethylenediamine and adipic acid at 283° C. over a period of one hour in amount sufficient to provide 1% by weight thereof on the polymer. The polymer containing the additive was converted to yarn which was knit to tubing, dyed by standard techniques, and evaluated in the Xenotester[3] at four inches from the arc for lightfastness. Results were as follows:

| Dye | Xeno Hours | Polyamide plus 1% Additive | Polyamide with No Additive (Control) |
|---|---|---|---|
| Milling Yellow 5GL | 20 | [1] 5-4 | [1] 4-3 |
| Anthraquinone Blue SWF | 40 | 5-4 | 4 |
| Capracyl Blue G | 20 | 4 | 3 |

[1] 5=no break.   1=severe break.

The above data show that the additive brought about an improvement in the lightfastness of the dye in the polyamide.

EXAMPLE D

Poly[2 - (o - N - monoacrylamidophenyl) - 2,1,3 - benzotriazole] was mechanically blended into flake from a hexamethylenediamineadipic acid polyamide, and the mixture spun, knit to tubing, dyed by standard techniques, and evaluated for lightfastness by exposure in the Xenotester. Results obtained were as follows:

| Dye | Hours to First Significant Color Change | |
|---|---|---|
| | Polyamide plus 4.0% Additive | Polyamide with No Additive (Control) |
| Milling Yellow 5G | >40 | <20 |
| Milling Red SWB | >40 | <20 |
| Anthraquinone Green GNN | 80 | 40 |
| Cibacette Br. Pink FG | 80 | 40 |
| Capracyl Yellow 3RD | >160 | 80 |

The above data show that the additive brought about at least 100% improvement in the lightfastness of the dye in the polyamide. The high degree of photostability imparted to both dyed and undyed polymer compositions by the compounds of this invention is even more remarkable when one considers the relative photoinstability of the corresponding para-isomer, as illustrated by the following examples.

EXAMPLE E

Films were cast from cellulosic acetate solutions containing 0.1 g. of 2-(o-acetamidophenyl)-2,1,3-benzotriazole and 2 g. of cellulose acetate and from similar solutions in which the benzotriazole was the para-isomer, i.e., 2-(p-acetamidophenyl)-2,1,3-benzotriazole. The films thus prepared were tested by cutting them into strips and superimposing the strips upon separate strips of a linear polyester fiber fabric which had been dyed at a 2% level with a light-sensitive Rhodamine red dyestuff and with a blue triphenylmethane dyestuff. The assemblies were exposed to light from a Fade-Ometer for 20 hours, with the following results.

| | Initial Appearance of Film | |
|---|---|---|
| | 2-(o-acetamidophenyl)-2,1,3-benzotriazole | 2-(p-acetamidophenyl)-2,1,3-benzotriazole |
| Daylight | Colorless | Light yellow. |
| Ultraviolet light | Not fluorescent | Fluorescent. |

| | Appearance of Film After Exposure | |
|---|---|---|
| Daylight | No change | Colorless. |
| Ultraviolet light | do | Decreased fluorescence. |

The above results show that the ortho-isomer is not fluorescent, in contrast to the para-isomer. The devel-

[2] Atlas Sunshine Arc Weather-Ometer, Model XW–R.

[3] This is a Xenotest instrument Model PL 394, made by Kanau of Germany.

opment of fluorescence is associated with photoinstability, and it is therefore clear that the para-isomer is not an effective ultraviolet light screening agent, in contrast with the ortho-isomer.

EXAMPLE F

Low-density polyethylene of molecular weight in the plastics range was blended by milling at 150° C. with 2-(o-benzamidophenyl)- and 2-(o-stearamidophenyl)-2,1,3-benzotrizole in amount sufficient to provide 0.5 to 1%, respectively, by weight of the triazole. The resulting product was melt-pressed at 160° C. into films of 6 to 8 mils in thickness, and the films were then exposed to a source of ultraviolet light, along with similar films of polyethylene containing no additive. The films containtection to the film, as evidenced by lack of color development.

EXAMPLE H

Two amides of 2-(o-aminophenyl)-2,1,3-benzotriazole, i.e., the methanesulfonamide and the 2,4-di-tert-amylphenoxyacetamide,[5] were incorporated into commercial grade, high molecular weight polyvinyl chloride by milling and films were then formed from the resulting compositions by pouring onto cylindrical 2¾ inch diameter tinned cups and heating 15 minutes in an oven at 180° C. to flux. Films were also formed from polyvinyl chloride containing no added amide as a control. The films were then exposed to "black light" fluorescent tubes for 168 hours. The results are shown in the table, below.

| Additive | Amount of Additive, Parts/100 Parts of Resin | Thickness of Films (mils) | Reflectance | | | |
|---|---|---|---|---|---|---|
| | | | Covered | Exposed | Decrease | Comments |
| None | | | 91 | 22 | <0 | >22 Very poor. |
| 2-(o-N-monomethane sulfonamidophenyl)-2,1,3-benzotriazole. | 1 | 90 | 19 | 16 | 3 | Good. |
| 2-(o-2,4-di-tert-amyl-phenoxyacetamidophenyl)-2,1,3-benzotriazole]. | 1 | 89 | 22 | 18 | 4 | Do. |

[1] Measured by a photovolt reflection colorimeter which employs a blue filter.
[5] Prepared as in Example II, using 2, 4-di-tert-amylphenoxyacetyl chloride in place of benzoyl chloride.

ing 0.5% of the benzotriazole showed no embrittlement after 700 hours exposure and those with 1% were not embrittled even after 900 hours. The control films were embrittled after 200 to 300 hours exposure. These results show that the benzotriazole extends the useful life of the polyethylene film, even at 0.5% concentration, by some two to three fold.

EXAMPLE G

To a 33⅓% solution of general purpose, high-molecular weight polystyrene in p-xylene there was added 2(o-N-monomethanesulfonamidophenyl) - 2,1,3 - benzotriazole, prepared as in Example XXII, in amount sufficient to provide one part of the amide to 100 parts of polymer. Films were prepared by doctoring the solution onto milk glass plates and air drying the coating at room temperature, followed by baking in an oven at 60° to 70° C. Similar films were prepared without added amide to serve as controls. The films prepared were exposed to a pair of 90 watt "black light" fluorescent lamps [4] at a distance of three inches from the lowest part of the fluorescent tube. The results are summarized in the table below.

[4] "Black lights" have a radiation peak of 3400 to 3600 A.

Polyvinyl chloride plastics discolor badly upon exposure to ultraviolet light unless skillfully formulated with suitable stabilizers.

The above results show that both the methanesulfonamido and the 2,4-tert-amylphenoxyacetamido derivatives of 2-(o-aminophenyl)-2,1,3-benzotriazole protected the polyvinyl chloride against discoloration on exposure to light.

Unlike nitrocellulose, ethyl cellulose degrades upon exposure to ultraviolet light without severe discoloration. Therefore, the strength of the film is used as a gauge for judging the performance of the stabilizers.

EXAMPLE I

An ethyl cellulose composition consisting of 6 parts of ethyl cellulose, 1.5 parts castor oil, 1.5 parts of tricresyl phosphate, and 42.5 parts of an 80/20 toluene/butanol solvent mixture was prepared. To this solution there was added 2-(o-N-monomethanesulfonamidophenyl)-2,1,3-benzotriazole in amount sufficient to provide one part thereof per 100 parts ethyl cellulose. Films were prepared by doctoring the solution onto white opal glass plates using a 0.03 inch blade. The coatings thus made were allowed to dry in air for 24 hours and then exposed to a General Electric 275 volt type RS Sun Lamp at a distance of 12 inches below the sun lamp. As a control, similar films were made from the ethyl cellu-

| Additive | Time of Exposure (hour) | Reflectance [1] | | Decrease | Comments |
|---|---|---|---|---|---|
| | | Covered | Exposed | | |
| None | 285 | 55 | 12 | 43 | Very poor. |
| 2-(o-N-monomethane sulfonamidophenyl)-2,1,3-benzotriazole. | 285 | 50 | 50 | 0 | Very good. |

[1] Measured by a photovolt reflection colorimeter which employs a blue filter.

The above results show the 2-(o-N-monomethanesulfonamidophenyl)-2,1,3-benzotriazole gave perfect prolose without added amide stabilizer. The results are shown in the table, below.

| Additive | Amount of Additive, Parts/100 Parts Ethyl cellulose | Time of Exposure (hours) | Reflectance | | | |
|---|---|---|---|---|---|---|
| | | | Covered | Exposed | Decrease | Comments |
| None | none | 65 | 85 | 77 | 8 | Some embrittlemet. |
| 2-(o-N-monomethane sulfonamidophenyl)-2,1,3-benzotriazole. | 1 | 65 | 83 | 79 | 4 | No embrittlement. |

The above data show that the amide was very effective in preventing embrittlement. An additional advantage realized was the lack of color development in the amide-containing film.

In tests carried out on films of a methyl methacrylate/ethyl acrylate copolymer, excellent protection against discoloration was realized in films containing 2-(o-N-monomethanesulfonamidophenyl)-2,1,3-benzotriazole. These films were cast from solutions of the resin in toluene containing 40% of the resin by weight. To these solutions there was added 2-(o-N-monomethanesulfonamidophenyl)-2,1,3-benzotriazole in amount sufficient to provide one part thereof per 100 parts of resin. The solutions were doctored onto opal glass plates with a 0.03 inch doctor knife and allowed to air dry 24 hours. The films thus obtained were exposed along with a control film containing no additive, under a GE 275 watt RS Sun Lamp. The results are summarized in the table below.

| Additive | Time of Exposure (hours) | Reflectance | | | Comments |
|---|---|---|---|---|---|
| | | Covered | Exposed | Decrease | |
| None | 96 | 96 | 90 | 6 | |
| 2-(o-N-monomethane sulfonamidophenyl)-2,1,3-benzotriazole. | 96 | 90 | 88 | 2 | Very good. |

The above results show that even after 96 hours' exposure, the film containing the amide had shown substantially no change in contrast to the control film.

The excellent stabilizing effect of the amides of 2-(o-aminophenyl)-2,1,3-benzotriazoles demonstrated above is most unexpected and certainly unpredictable from the known behavior of phenyl-2,1,3-benzotriazole, 2-(m-N-monoacetamidophenyl)-2,1,3-benzotriazole, and 2-(p-N-monoacetamidophenyl)-2,1,3-benzotriazole, which require relatively low numbers of quanta of energy for decomposition and hence are readily photodegradable.

EXAMPLE J

Poly(hexamethylene adipamide) was prepared in a conventional manner except that 3% by weight of [2,2'-(2,3,5,6 - tetramethylterephthaloyldiimino) - o - phenylene]-bis-2,1,3-benzotriazole, prepared as in Example XVI, was added to the salt solution prior to evaporation. The extruded and cut nylon flake was no different in color from a control batch containing no stabilizer and had essentially an equal molecular weight as shown by its relative viscosity. The ultraviolet spectrum of a sulfuric acid solution of the modified polymer showed an optical density and maximum absorption wave length expected for the 3% additive modification illustrating that none of the additive was lost or altered during the melt-polymerization.

The test and control polymers were spun in a conventional manner except that 5% by weight of molten poly-(ethylene oxide) ether glycol of approximately 20,000 molecular weight was meter-injected and uniformly dispersed throughout the molten polyamide prior to spinning as described in Belgian Patent 631,199. The spun yarns were drawn, bulked and tufted into carpet form by known techniques. Tensile properties of both the drawn and bulked fibers showed the test and control items to be essentially equivalent.

The tufted carpets were scoured preparatory to dyeing. Analysis of the U.V. spectrum of the scoured fibers showed no change in concentration of the added stabilizer. This was true even after several scourings.

The carpets were dyed with two compound dye shades using conventional procedures for three classes of dyes: acid, dispersed and premetallized. The dyed carpets were exposed under glass to Florida sunlight for 80 hrs. and compared to unexposed samples to determine the degree of fading. Comparisons were made by the Gray Rating Scale whereby 5 represents no change in shade and 1 represents almost complete loss of color. A full unit difference between items represented about a two-fold difference in fading rate between the samples. Quarter units up or down are represented by plus or minus signs respectively, and half units by hyphenated numbers. Results as shown in the following table average almost one full unit or a two-fold improvement in dye fading rate for the item containing the stabilizer.

| Dye Class | Acid | | Disperse | | Premetallized | |
|---|---|---|---|---|---|---|
| Dye Shade | Cocoa | Sea Spray | Cocoa | Sea Spray | Cocoa | Sea Spray |
| Control | 2− | 2− | 2+ | 2 | 2 | 2+ |
| Test Item | 3 | 3+ | 3−2 | 3−2 | 3 | 3 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

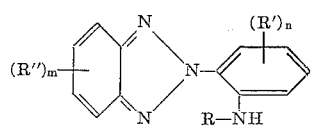

wherein R is an acyl group selected from the class consisting of
   (a) R'''CO— wherein R''' is a group of the class consisting of
      (1) hydrocarbon of 1 to 19 carbon atoms free of acetylenic unsaturation,
      (2) substituted hydrocarbon of 1 to 19 carbon atoms free of acetylenic unsaturation wherein the substituents are of the class consisting of fluorine, chlorine, bromine, nitro, amino, hydroxy, carboxy, metal carboxylate, halocarbonyl, alkoxy, and alkoxycarbonyl of up to 7 carbon atoms, and o-[2(2,1,3-benzotriazole)]-phenylaminocarbonyl, and
      (3) a heterocyclic ring selected from the group consisting of pyridinyl, piperidinyl, furyl, thiazolyl, benzothiazolyl, quinoxalinyl, quinolyl and 2,3-dichloroquinoxalinyl;
   (b) $R^{IV}SO_2$— wherein $R^{IV}$ is a group of the class consisting of
      (1) hydrocarbon of 1 to 19 carbon atoms free of acetylenic unsaturation, and
      (2) a heterocyclic ring selected from the group consisting of pyridinyl, piperidinyl, α-methylpyridinyl, α-butylpiperidinyl and benzothiazolyl;
   (c) $R^{V}PO_2$— wherein $R^{V}$ is a hydrocarbon of 1 to 19 carbon atoms free of acetylenic unsaturation;
wherein R' and R'' each are of up to 19 carbon atoms and are selected from the group consisting of alkyl, alkoxy, alkenyl of 4 to 8 carbon atoms which forms a fused areno structure of 10 to 14 carbons with one of the benzo and aminophenyl moieties of the benzotriazole, fluorine, chlorine, bromine, nitro, sulfo, sulfo salt, carboxy, and cyano; and $m$ and $n$ each are cardinal numbers of from 0 to 4, inclusive.

2. 2-(o-N-monohydrocarbylamidophenyl)-2,1,3-benzotriazole wherein the hydrocarbyl group is free of acetylenic unsaturation and contains less than 19 carbon atoms.

3. The compound of claim 2 wherein said hydrocarbyl group is an alkenyl of up to 12 carbon atoms.

4. The compound of claim 2 wherein said hydrocarbyl group is alkyl of up to 12 carbon atoms.

5. The compound of claim 2 wherein the hydrocarbylamido group is sterically hindered.

6. 2-(o-N-substituted hydrocarbylamidophenyl)-2,1,3-benzotriazole wherein the hydrocarbyl group is free of acetylenic unsaturation and contains less than 19 carbon atoms, and wherein the substituent is carboxy.

7. The calcium carboxylate salt of the compound of claim 6.

8. The compound of claim 1 wherein R''' is substituted hydrocarbon in which the substituent is o-[2(2,1,3-benzotriazolyl)]-phenylaminocarbonyl.

9. 2-(o-N-hydrocarbylsulfonamidophenyl)-2,1,3-benzotriazole wherein the hydrocarbyl group is free of acetylenic unsaturation and contains less than 19 carbon atoms.

10. The compound of claim 9 wherein said hydrocarbyl group is alkyl of up to 12 carbon atoms.

11. 2 - (o - N - monoacrylamidophenyl) - 2,1,3 - benzotriazole.

12. 2 - (o - N - monomethacrylamidophenyl) - 2,1,3-benzotriazole.

13. 2 - (o - N - monopivalamidophenyl) - 2,1,3 - benzotriazole.

14. [2,2' - (2,3,5,6 - tetramethylterephthaloyldiimino)-o-phenylene]-bis-2,1,3-benzotriazole.

15. 2 - (o - N - monomethanesulfonamidophenyl) - 2,1,3-benzotriazole.

16. 2 - (o - N - monobenzamidophenyl) - 2,1,3 - benzotriazole.

17. The compound of claim 3 wherein the alkenyl group is monoethylenic and the double bond is between carbons which are $\alpha,\beta$ with respect to the carbamido group.

References Cited by the Examiner
UNITED STATES PATENTS

| | | | |
|---|---|---|---|
| 1,594,866 | 8/1926 | Zitscher | 260—308 |
| 3,148,179 | 9/1964 | Carboni | 260—308 |
| 3,153,048 | 10/1964 | Thatcher | 260—308 |
| 3,159,646 | 12/1964 | Milionis et al. | 260—308 |
| 3,162,696 | 12/1964 | Zimmerman et al. | 260—878 |
| 3,162,697 | 12/1964 | Canterino et al. | 260—878 |

HENRY R. JILES, *Acting Primary Examiner.*

NICHOLAS S. RIZZO, *Examiner.*

A. D. ROLLINS, *Assistant Examiner.*

UNITED STATES PATENT OFFICE
CERTIFICATE OF CORRECTION

Patent No. 3,267,113

August 16, 1966

Rudolph A. Carboni

It is hereby certified that error appears in the above numbered patent requiring correction and that the said Letters Patent should read as corrected below.

Column 8, line 19, after "4.55" insert -- % --; column 12, line 42, for "sulfide nonahydrate" read -- sulfide-nonahydrate --; column 14, EXAMPLE XXIII, the second reactant, the right-hand portion should appear as shown below instead of as in the patent:

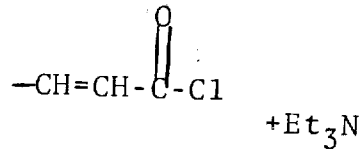

lines 24 to 36, the left-hand portion of the formula should appear as shown below instead of as in the patent:

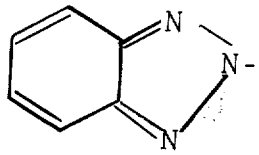

column 17, lines 22 to 30, the right-hand portion of the formula should appear as shown below instead of as in the patent:

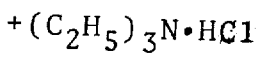

column 22, line 65, strike out the comma, first occurrence; column 23, line 2, for "imino" read -- amino --; column 26, line 3, after "were" insert -- as --; columns 27 and 28, last table, last column, lines 1 and 2 thereof, for 3,267,113

"embrittlemet" read -- embrittlement --; column 30, line 58, for "-benzotriazole" read ---benzotriazolyl --.

Signed and sealed this 22nd day of August 1967.

(SEAL)
Attest:

ERNEST W. SWIDER
Attesting Officer

EDWARD J. BRENNER
Commissioner of Patents